(12) United States Patent
Cholewin et al.

(10) Patent No.: US 8,497,884 B2
(45) Date of Patent: Jul. 30, 2013

(54) ELECTRONIC DEVICE AND METHOD FOR MANIPULATING GRAPHIC USER INTERFACE ELEMENTS

(75) Inventors: Erik A Cholewin, Libertyville, IL (US); John J Gorsica, Round Lake, IL (US); Michael J Lombardi, Lake Zurich, IL (US); Natalie J Prochnow, Spring Grove, IL (US); Ian M Snyder, Vernon Hills, IL (US)

(73) Assignee: Motorola Mobility LLC, Libertyville, IL (US)

(*) Notice: Subject to any disclaimer, the term of this patent is extended or adjusted under 35 U.S.C. 154(b) by 975 days.

(21) Appl. No.: 12/565,200

(22) Filed: Sep. 23, 2009

(65) Prior Publication Data

US 2011/0012921 A1    Jan. 20, 2011

Related U.S. Application Data

(63) Continuation-in-part of application No. 12/505,775, filed on Jul. 20, 2009.

(51) Int. Cl.
   *G06F 3/048* (2006.01)
   *G09G 5/00* (2006.01)

(52) U.S. Cl.
   USPC .......................................................... 345/678

(58) Field of Classification Search
   CPC .................................................. G06F 3/04845
   USPC ................. 345/650–654, 661–665, 676–680; 715/863
   See application file for complete search history.

(56) References Cited

U.S. PATENT DOCUMENTS

| 4,076,262 A | 2/1978 | Deventer |
| 5,128,671 A | 7/1992 | Thomas, Jr. |

(Continued)

FOREIGN PATENT DOCUMENTS

| EP | 1408400 A2 | 4/2004 |
| EP | 1517223 A1 | 3/2005 |

(Continued)

OTHER PUBLICATIONS

Masanori Sugimoto and Keiichi Hiroki, HybridTouch: An Intuitive Manipulation Technique for PDAs Using Their Front and Rear Surfaces, 2006, Proceeding MobileHCI '06 Proceedings of the 8th conference on Human-computer interaction with mobile devices and services, pp. 137-140.*

(Continued)

*Primary Examiner* — Jeffery A Brier
(74) *Attorney, Agent, or Firm* — Sylvia Chen

(57) ABSTRACT

An electronic device for manipulating graphical user interface elements has a touch-sensitive display (touch screen) and a touch-sensitive surface (touch pad). The electronic device displays at least two graphical user elements (data icon, program icon, application window, digital photograph, etc.) on the touch screen. A user touches a first element using either the touch screen or the touch pad. This touch user interaction selects the first element and "anchors" it while a user's slide interaction on the other touch-sensitive surface manipulates the second, non-selected element. The slide contact can be interpreted by the electronic device as a drag, push, rotate, or pixel-based move (e.g., zoom in/out) relative to the first element. Various features of the slide movement, such as the speed, the length, the pressure, the direction, and/or the pattern may affect the manipulation of the second element.

15 Claims, 20 Drawing Sheets

U.S. PATENT DOCUMENTS

| | | | |
|---|---|---|---|
| 5,543,588 | A | 8/1996 | Bisset et al. |
| 5,610,971 | A | 3/1997 | Vandivier |
| 5,623,280 | A | 4/1997 | Akins et al. |
| 5,729,219 | A | 3/1998 | Armstrong et al. |
| 5,896,575 | A | 4/1999 | Higginbotham et al. |
| 5,959,260 | A | 9/1999 | Haghooghi et al. |
| 6,020,878 | A | 2/2000 | Robinson |
| 6,201,554 | B1 | 3/2001 | Lands |
| 6,392,870 | B1 | 5/2002 | Miller, Jr. |
| 6,457,547 | B2 | 10/2002 | Novitschitsch |
| 6,466,198 | B1 | 10/2002 | Feinstein |
| 6,597,347 | B1 | 7/2003 | Yasutake |
| 6,927,747 | B2 | 8/2005 | Amirzadeh et al. |
| 7,075,513 | B2 | 7/2006 | Silfverberg et al. |
| 7,205,959 | B2 | 4/2007 | Henriksson |
| 7,218,313 | B2 | 5/2007 | Marcus et al. |
| 7,453,443 | B2 | 11/2008 | Rytivaara et al. |
| 8,265,717 | B2 | 9/2012 | Gorsica et al. |
| 2001/0052122 | A1* | 12/2001 | Nanos et al. ............ 725/9 |
| 2003/0197678 | A1 | 10/2003 | Siddeeq |
| 2003/0199290 | A1 | 10/2003 | Viertola |
| 2003/0234768 | A1 | 12/2003 | Rekimoto et al. |
| 2005/0012723 | A1* | 1/2005 | Pallakoff ............ 345/173 |
| 2005/0020325 | A1 | 1/2005 | Enger et al. |
| 2005/0024339 | A1 | 2/2005 | Yamazaki et al. |
| 2005/0096106 | A1 | 5/2005 | Bennetts et al. |
| 2005/0275416 | A1 | 12/2005 | Hervieux et al. |
| 2006/0017711 | A1 | 1/2006 | Pihlaja |
| 2006/0092355 | A1 | 5/2006 | Yang et al. |
| 2006/0197750 | A1 | 9/2006 | Kerr et al. |
| 2006/0284853 | A1 | 12/2006 | Shapiro |
| 2007/0075915 | A1 | 4/2007 | Cheon et al. |
| 2007/0097151 | A1 | 5/2007 | Rosenberg |
| 2007/0103454 | A1 | 5/2007 | Elias |
| 2007/0177803 | A1 | 8/2007 | Elias et al. |
| 2008/0261661 | A1 | 10/2008 | Jessop |
| 2009/0046110 | A1* | 2/2009 | Sadler et al. ............ 345/660 |
| 2009/0061948 | A1* | 3/2009 | Lee et al. ............ 455/566 |
| 2009/0066660 | A1 | 3/2009 | Ure |
| 2009/0096749 | A1 | 4/2009 | Kawahara et al. |
| 2009/0131117 | A1 | 5/2009 | Choi |
| 2009/0140863 | A1 | 6/2009 | Liu et al. |
| 2009/0241048 | A1 | 9/2009 | Augustine et al. |
| 2010/0113100 | A1 | 5/2010 | Harmon et al. |
| 2010/0134409 | A1* | 6/2010 | Challener et al. ............ 345/156 |
| 2010/0219943 | A1 | 9/2010 | Vanska et al. |
| 2010/0277421 | A1 | 11/2010 | Charlier et al. |
| 2011/0012928 | A1 | 1/2011 | Cholewin et al. |
| 2011/0190675 | A1 | 8/2011 | Vess |

FOREIGN PATENT DOCUMENTS

| | | | |
|---|---|---|---|
| EP | 0913977 | B1 | 9/2006 |
| EP | 2065786 | A1 | 6/2009 |
| GB | 2339505 | A | 1/2000 |
| GB | 2368483 | A | 5/2002 |
| WO | 2004114636 | A1 | 12/2004 |
| WO | 2008030563 | A2 | 3/2008 |

OTHER PUBLICATIONS

Product information for Adesso Easy Cat 2 Button Glidepoint Touchpad (Black), downloaded on Sep. 12, 2012 from Adesso.com website, http://www.adesso.com/en/component/content/article/63-touchpads/189-gp-160.html, 2 pages.*

Patent Cooperation Treaty, "PCT Search Report and Written Opinion of the International Searching Authority" for International Application No. PCT/US2010/031879, Jul. 7, 2010, 14 pages.

Patrick Baudisch, "Application Areas of Lucid Touch", Microsoft Research & Mitsubishi Research, http://research.microsoft.com/users/baudisch/projects/lucidtouch/applications, accessed Nov. 26, 2008, 3 pages.

Daniel Wigdor et al., "Lucid Touch: A See-through Mobile Device", Proceedings of the 20th Annual ACM Symposium on User Interface Software and Technology, Oct. 7-10, 2007, pp. 269-278, XP002582051.

USPTO U.S. Appl. No. 12/433,253, "Hand Held Electronic Device and Method of Performing a Dual Sided Gesture" filed Apr. 30, 2009, 34 pages.

USPTO U.S. Appl. No. 12/492,369, "Implementation of Touchpad on Rear Surface of Single-Axis Hinged Device" filed Jun. 6, 2009, 27 pages.

Patrick Baudisch and Gerry Chu, "Lucid Touch Homepage", Microsoft Research & Mitsubishi Electric Research Labs, http://research.microsoft.com/users/baudisch/projects/lucidtouch/index.html, accessed Nov. 26, 2008, 5 pages.

Patent Cooperation Treaty, "Invitation to Pay Additional Fees" for International Application No. PCT/US2010/037568, Sep. 23, 2010, 7 pages.

Patent Cooperation Treaty, "Search Report and Written Opinion of the International Searching Authority" for International Application No. PCT/US2010/040876, Oct. 5, 2010, 14 pages.

Erh-li (Early) Shen et al., "Double-side Multi-touch Input for Mobile Devices", CHI 2009—Spotlight on Works in Progress, Apr. 4-9, 2009, pp. 4339-4344, Boston, MA, USA.

U.S. Appl. No. 12/433,252, filed Apr. 30, 2009, in the name of Michael L. Charlier, entitled "Hand Held Electronic Device and Method of Performing a Dual Sided Gesture".

Microsoft, "Microsoft's LucidTouch See-Through Touchscreen Unveiled", Mar. 10, 2008, pp. 1-2, http://www.dancewithshadows.com/tech/lucid-touch.asp.

United States Patent and Trademark Office, "Non-Final Office Action" for U.S. Appl. No. 12/505,775, Dec. 23, 2011, 19 pages.

Gregory Wilson, "Evaluating the Effectiveness of Using Touch Sensor Capacitors as an Input Device for a Wrist Watch Computer", Georgia Institute of Technology undergraduate thesis, smartech.gatech.edu/xmlui/handle/1853/19947, Dec. 17, 2007, 15 pages.

Jun Rekimoto, "GestureWrist and GesturePad: Unobtrusive Wearable Interaction Devices", http://www.sonycsl.co.jp/person/rekimoto/papers/iswc01.pdf, 5th IEEE Int'l Symp. on Wearable Computers, 2001, pp. 21-27.

Paul H. Dietz et al., "A Practical Pressure Sensitive Computer Keyboard", 22nd Ass'n for Computing Machinery Symp. on User Interface Software and Tech., Oct. 4, 2009, 4 pages.

Samsung, "Samsung Wearable Mobile Device Makes Communication Easier for an Active Lifestyle", , http://www.tuvie.com/samsung-wearable-mobile-device-can-make-communication-easier-in-adventurous-trips/, Apr. 3, 2010, 10 pages.

Charles Mclellan, "Eleksen Wireless Fabric Keyboard: A First Look", http://www.zdnet.com/eleksen-wireless-fabric-keyboard-a-first-look-3039278954, Jul. 17, 2006, 9 pages.

* cited by examiner

ELECTRONIC DEVICE AND METHOD FOR MANIPULATING GRAPHIC USER INTERFACE ELEMENTS

CROSS REFERENCE TO RELATED APPLICATIONS

This application is related to the following U.S. patent application:

"Method for Implementing Zoom Functionality on a Portable Device with Opposing Touch Sensitive Surfaces" by Erik Cholewin et al., application Ser. No. 12/505,775 filed on Jul. 20, 2009.

The related application is assigned to the assignee of the present application and is hereby incorporated herein in its entirety by this reference thereto.

FIELD OF THE DISCLOSURE

The present disclosure relates generally to user interaction with an electronic device, and more particularly to dual-sided gestures implemented using an electronic device that accepts touch input on multiple sides.

BACKGROUND

Electronic device manufacturers are increasingly using touch-sensitive displays (touch screens), which enable a device to visually convey information to a user as well as to enable a user to interact contextually with displayed graphical user elements and otherwise provide user input to the electronic device. Some electronic device manufacturers are contemplating devices with a touch pad as well as a touch screen. In one contemplated configuration, a touch sensitive display is placed on an obverse side of a housing of an electronic device and a touch pad is placed on a reverse side of the housing. Given this contemplated configuration, there are various opportunities to develop new touch interactions with an electronic device.

The various aspects, features and advantages of the disclosure will become more fully apparent to those having ordinary skill in the art upon careful consideration of the following Drawings and accompanying Detailed Description.

DETAILED DESCRIPTION

Figure 1:
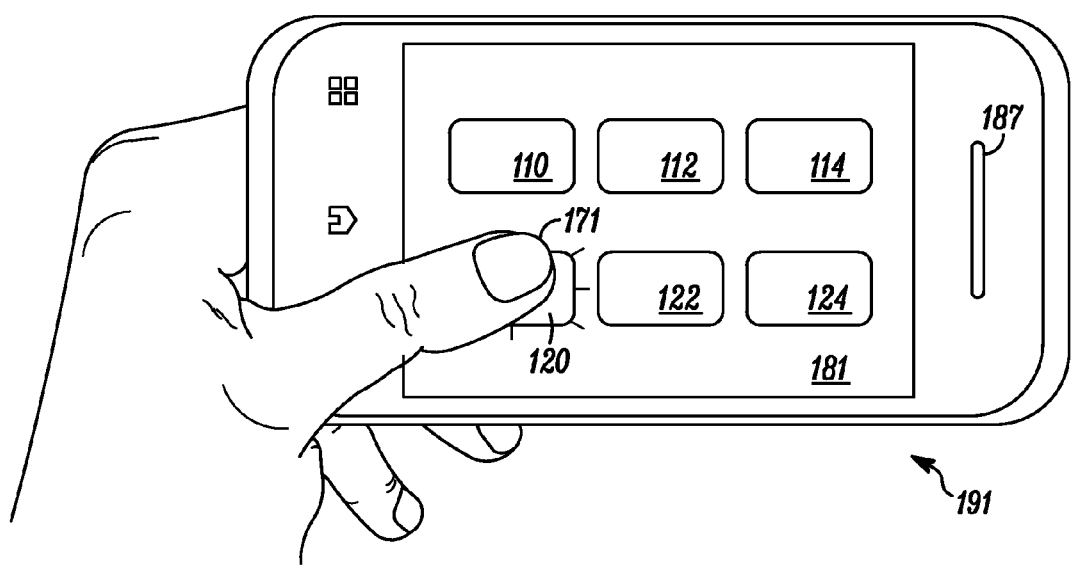
FIG. 1 illustrates an obverse side of an electronic device with a touch screen and a touch pad, and it depicts a user interaction with the touch screen.

An electronic device for manipulating graphical user interface elements has a touch-sensitive display (touch screen) on an obverse side of the electronic device and a touch-sensitive surface (touch pad) on a reverse side of the electronic device. The electronic device displays at least two graphical user elements (data icon, program icon, application window, digital photograph, etc.) on the touch screen. A user touches a first element using either the touch screen or the touch pad. This touch selects the first element and "anchors" it while a user's slide motion on the other touch-sensitive surface manipulates the second element.

The slide contact sensed on the other touch-sensitive surface can be interpreted by the electronic device as a drag (lateral movement of the second element within the plane of the display screen) relative to the first element, a push (virtual movement of the second element in front or behind the plane of the display screen) relative to the first element, a rotate (rotational movement of the second element within the plane of the display screen) relative to the first element, or a pixel-based move (zoom in/out or enlarge/reduce) relative to the first element.

Various features of the slide movement, such as the speed, the length, the pressure, the direction, and/or the pattern may affect the interpretation. For example, a rotational slide movement may direct the electronic device to rotate the second element relative to the first element while a linear slide movement may direct the electronic device to drag the second element relative to the first element. As another example, sliding to the right may control a zoom out (with the length of the slide movement relating to the percentage of zoom out) while sliding to the left may control a zoom in (with the length of the slide movement relating to the percentage of zoom in).

The touch and slide movements on touch-sensitive surfaces on different sides of the electronic device are at least partially overlapping in time, with the touch starting prior to or simultaneously with the slide. By supporting dual-sided gestures, the electronic device may enable known graphical user interface interactions and provide support for additional graphical user interface interactions.

FIGS. 1-4 illustrate an obverse side 191 and a reverse side 195 of an electronic device 100 with a touch screen 181 and a touch pad 185. An obverse side of an object is a side that is primarily intended to be viewed by a user, and the obverse side 191 of the electronic device 100 contains the touch screen 181 or other type of touch-sensitive display. The reverse side of an object is a side that is not intended to be primarily viewed by a user, and the reverse side 195 of the electronic device 100 contains a touch pad 185 or other type of touch-sensitive surface without a display. If desired, the reverse side 195 could contain a touch screen instead of the touch pad 185 shown, although the user is not expected to look at the reverse side when the electronic device 100 is subjected to the dual-sided gestures.

The electronic device 100 shown is a portable, handheld electronic device such as a mobile phone, remote controller, personal digital assistant, portable audio or video player, handheld game console, or the like; however, the electronic device could be implemented as a non-handheld device such as an interactive table-like surface.

The touch screen 181 shows, in this example, six graphical user interface elements 110, 112, 114, 120, 122, 124. These elements can be data icons (e.g., file folders, documents, spreadsheets, address book contacts, photo files, music files, video files, electronic book files, etc.) to access data, program icons (e.g., word processing, presentation, browser, media player, calendar, geographic navigation, electronic mail or text messaging, electronic games, etc.) to access software applications, application windows (for individual instances of opened software applications, file folder navigation, etc.), links/shortcuts to any of the above, and the like. If a user would like to manipulate one or more of the graphical user elements, the user touches a first element, using either the touch screen 181 on the obverse side 191 or the touch pad 185 on the reverse side 195, to select a first element. If a slide contact occurs on the other touch-sensitive surface, overlapping in time with the touch contact, the electronic device 100 will manipulate the other graphical user interface elements relative to the first element.

FIG. 1 depicts a user interaction 171 with the touch screen 181. At this point in time, the user has touched a first element 120 using the touch screen 181. In order to provide feedback to the user regarding the touch-selection of the first element 120, the selected graphical user element 120 may graphically change properties (e.g., darken, lighten, "blink", underline, bold, etc.), provide a haptic response (e.g., vibration, etc.), or the electronic device 100 may provide audio feedback (e.g., click, tone, or other noise) using an audio speaker 187. A highlighting visual feedback is shown.

Figure 2:
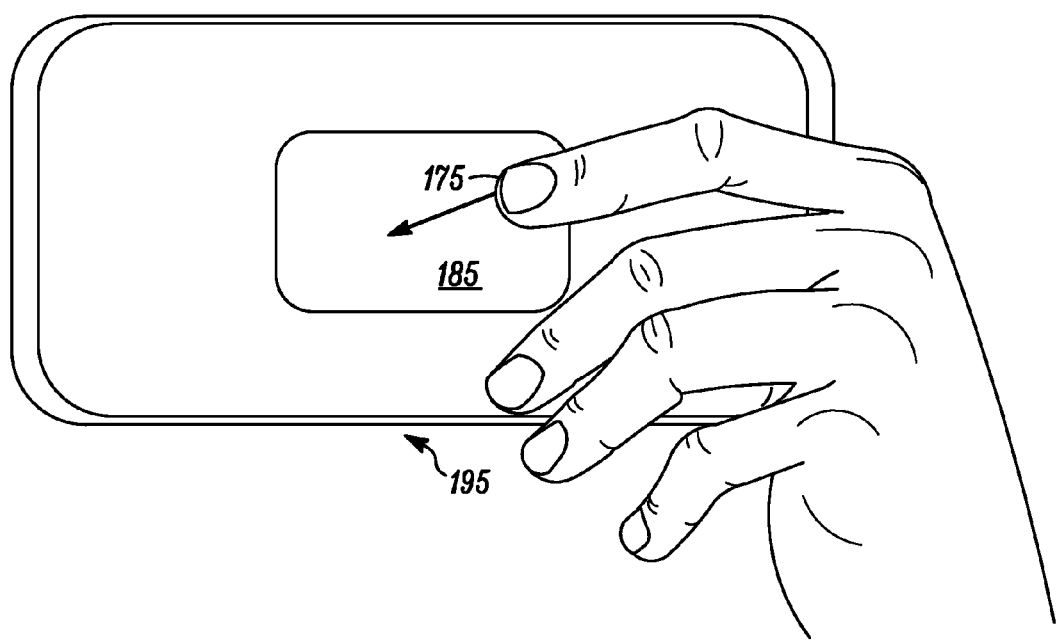
FIG. 2 illustrates a reverse side of the electronic device of FIG. 1, and it depicts a user interaction with the touch pad.
Figure 3:
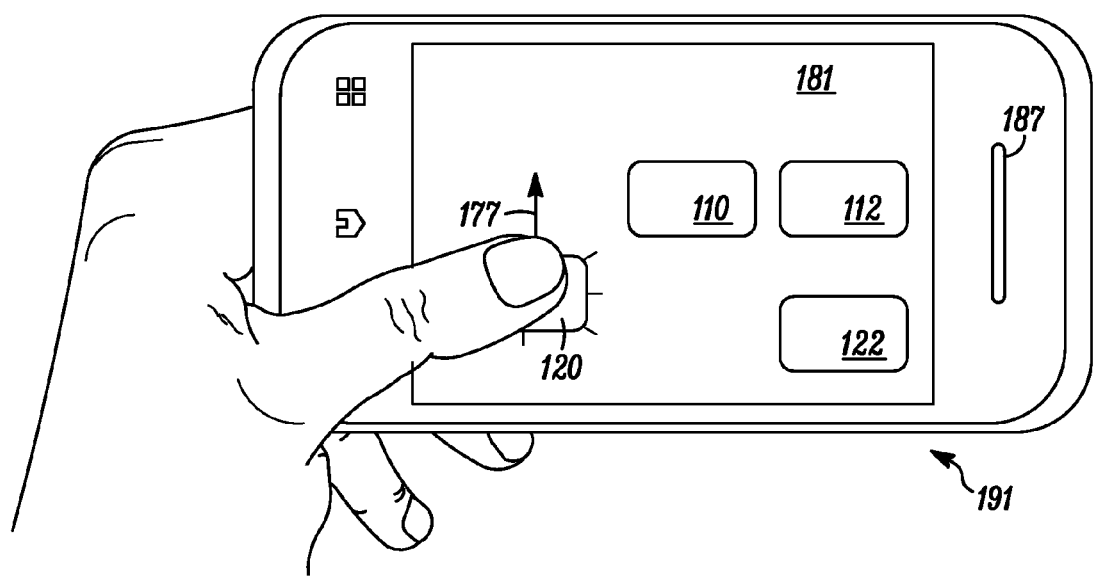
FIG. 3 illustrates the obverse side of the electronic device of FIG. 1 after completion of the user interaction with the touch pad, and it also depicts a subsequent user interaction with the touch screen.

FIG. 2 depicts a user interaction 175 with the touch pad 185. Looking at the reverse side 195 of the electronic device 100, the user slides a finger along the touch pad 185 surface. The slide interaction 175 at least partially overlaps in time with the touch interaction 171. After the slide interaction 175 begins, the user may release the touch interaction 171. Alternately, the user may maintain the touch interaction 171 after the slide interaction 175 begins as shown in FIG. 3 via the continued highlighting visual effect. Because the touch pad 185 is on the reverse side 195 of the electronic device 100, the slide interaction 175 is mirrored on the obverse side 191. FIG. 3 illustrates the obverse side 191 of the electronic device after completion of the slide user interaction 175 with the touch pad 185. Note that the non-selected graphical user elements 110, 112, 114, 122, 124 have been dragged relative to the selected element 120, and the selected element 120 has remained stationary on the touch screen 181. The movement of the non-selected elements 110, 112, 114, 122, 124 is in accordance (mirror image relationship) with the slide interaction 175 on the touch pad 185. Note that some of the non-selected elements 114, 124 have moved off the right edge of the touch screen due to the limited size of the touch screen 181. A scrolling function (not shown) may be implemented to move those elements 122, 124 back onto the touch screen 181, perhaps with the side-effect of element 120 moving off the left edge of the touch screen.

Figure 4:
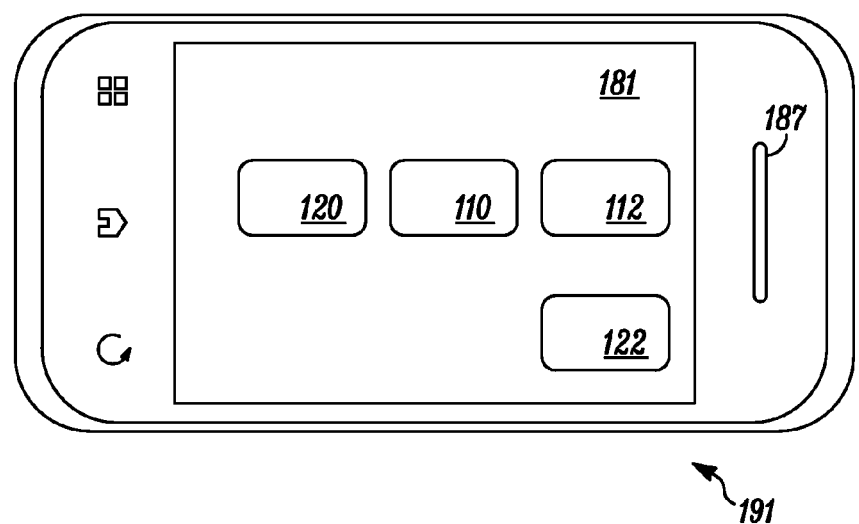
FIG. 4 illustrates an obverse side of the electronic device of FIG. 1 after completion of the subsequent user interaction with the touch screen.

FIG. 3 also depicts an optional subsequent user interaction 177 with the touch screen 181. At this point, a known touch screen interaction is performed as an extension to the touch interaction 171. For example, the user moves the former touch interaction 171. The touched element 120 follows the subsequent user interaction 177, and FIG. 4 illustrates the touch screen 181 after completion of the additional user interaction 177, when the user is no longer contacting the touch screen 181 or the touch pad 185. If the touch interaction 171 has been persistent throughout the slide interaction 175, the subsequent interaction 177 may simply be a movement on the touch screen 181 after the slide interaction 175 has concluded. Alternately, the user could release the touch interaction 171 after the slide interaction 175 begins, and the subsequent user interaction 177 could be a separate touch-and-drag interaction.

Although a two-dimensional matrix layout has been shown, the graphical user interface screen can be reduced to a one-dimensional matrix layout such as a list of song files, electronic book files, address book contact files, etc.

The dual-sided gesture has been illustrated as a single-handed gesture; however, two hands can be used to perform the touch and slide movements shown. In some electronic device implementations, the electronic device 100 as shown is only a portion of a larger electronic device akin to a hinged laptop computer. When the laptop-configured electronic device is in an open position, using two hands to perform the dual-sided gesture may be ergonomically easier—depending on the size and location of the touch screen, the size and location of the touch pad, and individual user preferences.

Figure 5:
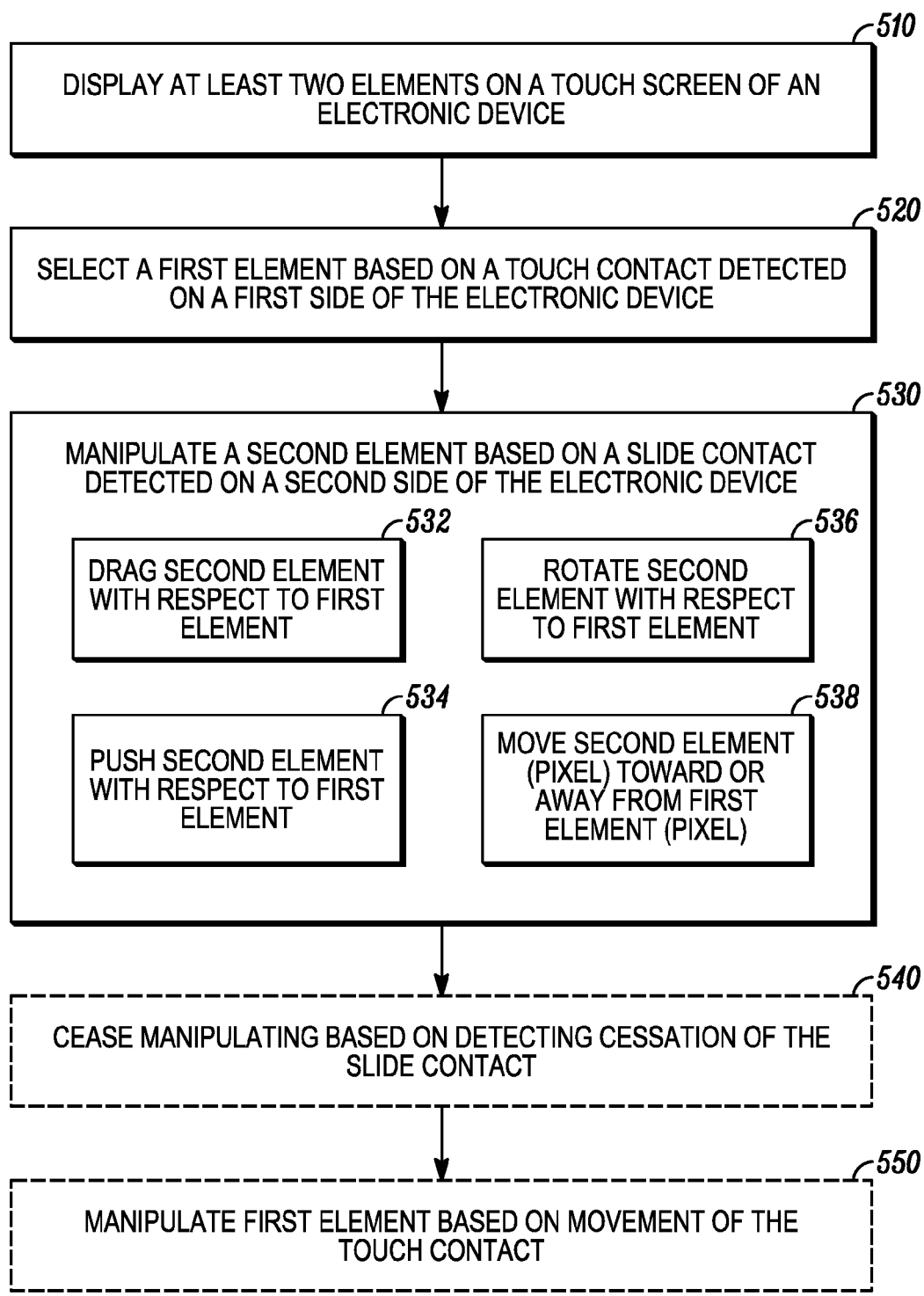
FIG. 5 illustrates a flow chart for an electronic device manipulating graphical user interface elements.

FIG. 5 illustrates a flow chart 500 for an electronic device manipulating graphical user interface elements. The electronic device has a touch screen (or other type of touch-sensitive display) and another touch-sensitive surface (such as a touch pad or a second touch screen).

Initially, the electronic device displays 510 at least two graphical user interface elements on a touch screen. Next, the electronic device selects 520 a first element based on a touch contact detected on a touch-sensitive surface. The selection may be indicated to a user visually or audibly as previously described. After that, the electronic device manipulates 530 a non-selected graphical user interface element based on a slide contact detected on a different touch-sensitive surface.

Figure 16:
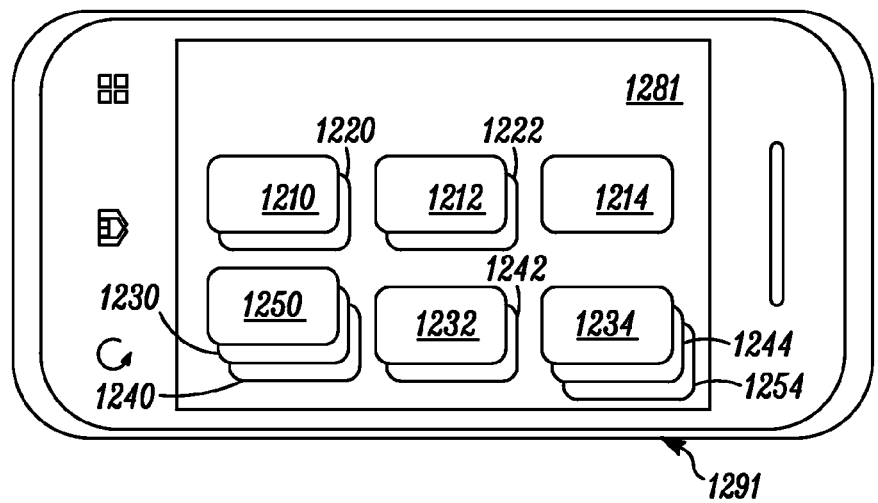
FIG. 16 illustrates an obverse side of the electronic device of FIG. 12 after completion of the alternate user interaction with the touch screen.
Figure 17:
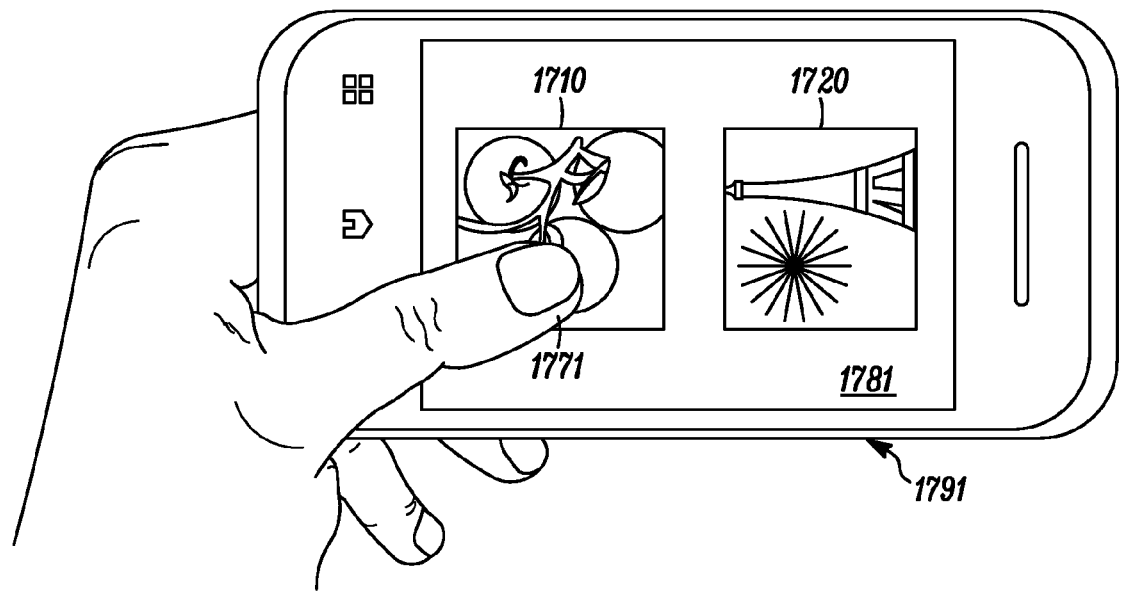
FIG. 17 illustrates an obverse side of an electronic device with a touch screen and a touch pad, and it depicts a user interaction with the touch screen.
Figure 18:
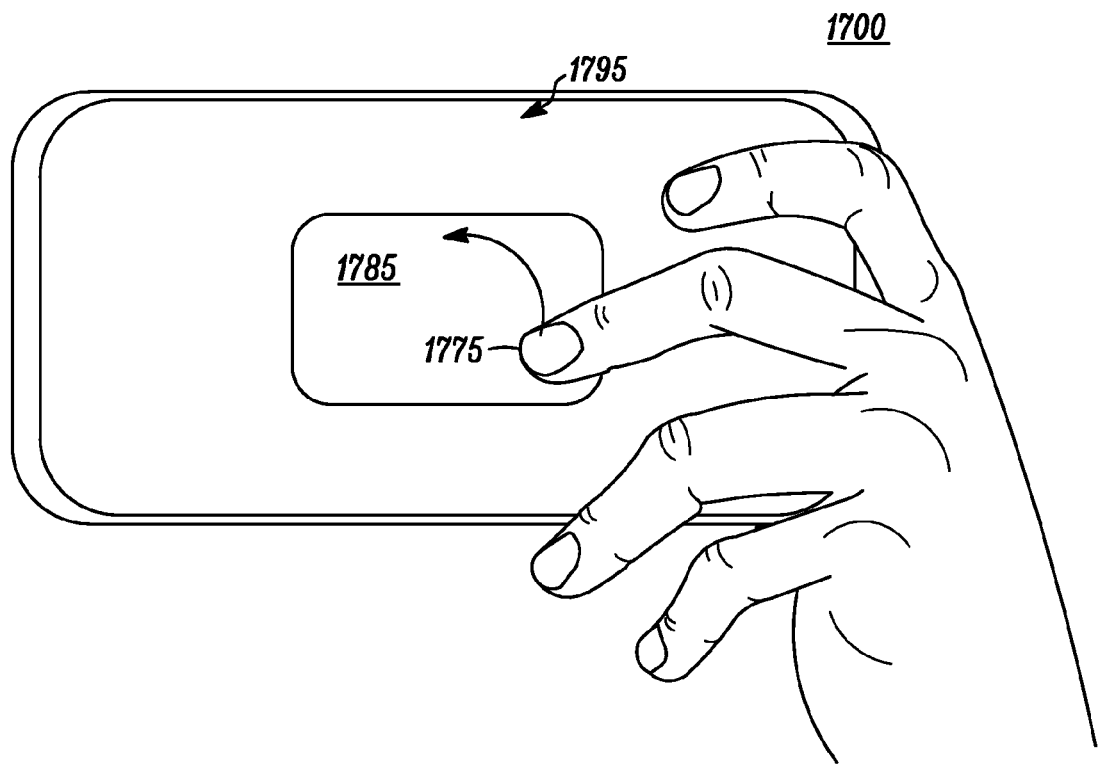
FIG. 18 illustrates a reverse side of the electronic device of FIG. 17, and it depicts a user interaction with the touch pad.
Figure 19:
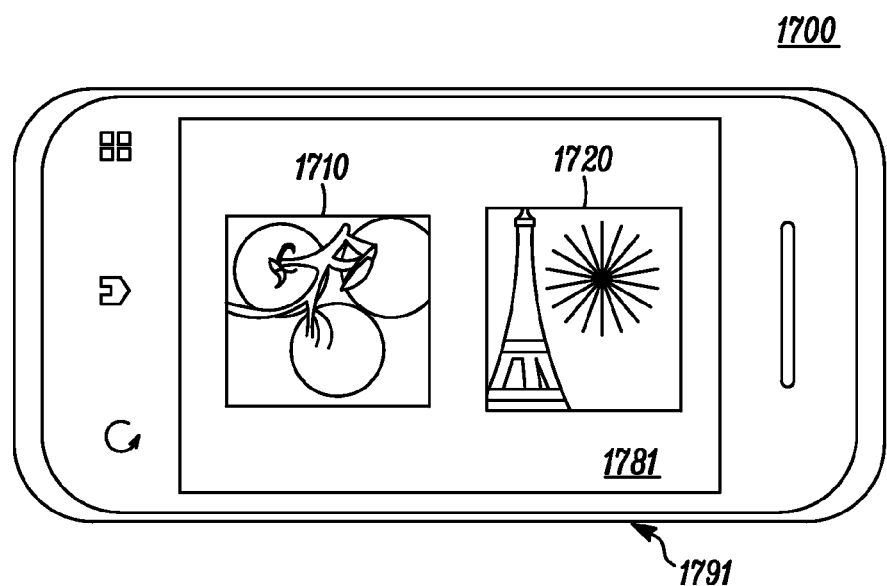
FIG. 19 illustrates an obverse side of the electronic device of FIG. 17 after completion of the user interaction with the touch pad.

Different types of manipulations are possible depending on the operational mode of the electronic device, the type of graphical user interface element selected via the touch contact, the pattern of the slide movement, and other factors. One type of manipulation drags 532 the non-selected element with respect to the first element as shown in FIGS. 1-3 and 6-8. Another type of manipulation pushes 534 the non-selected element with respect to the first element as shown in FIGS. 9-16. A third type of manipulation rotates 536 the non-selected element with respect to the first element as shown in FIGS. 17-19. And a fourth type of manipulation moves pixels 538 relative to the selected element, which is interpreted by the electronic device as a selected pixel. In this manner, zoom in/out or icon enlargement/reduction can be performed as directed by the slide movement as shown in FIGS. 20-29.

The electronic device can optionally cease 540 manipulating based on detecting cessation of the slide contact. If the touch contact has been persistent throughout the slide contact, the electronic device can manipulate 550 the first element based on movement of the touch contact after the slide contact ceases.

Figure 6:
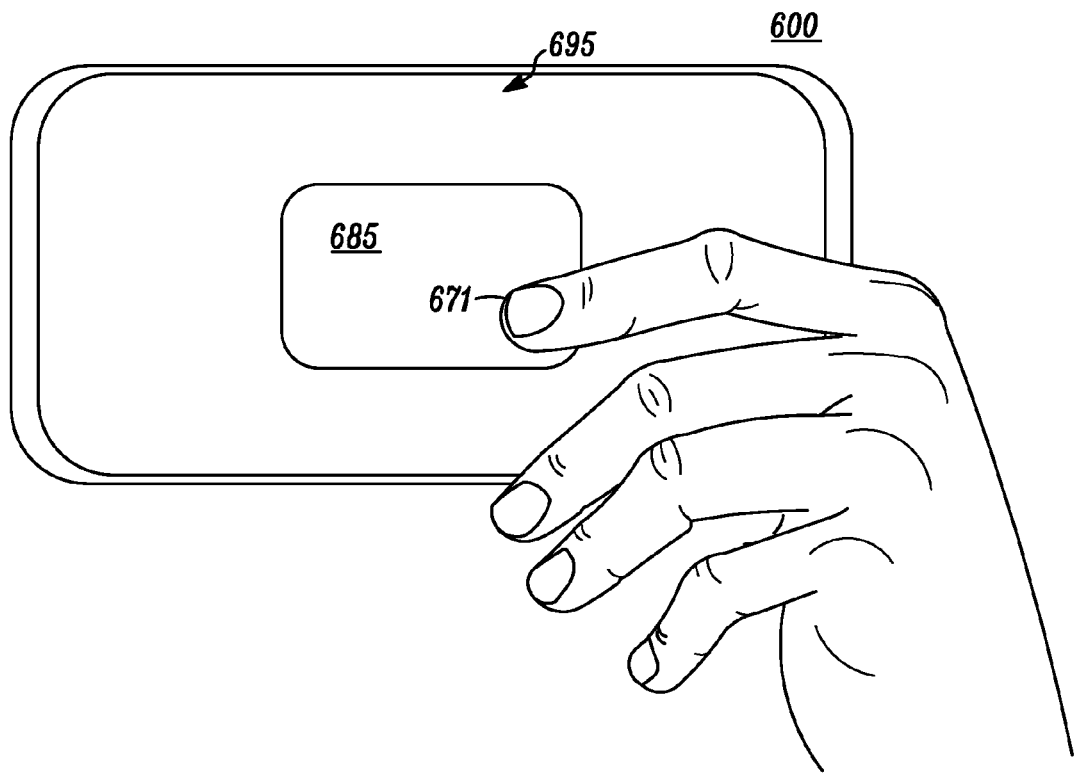
FIG. 6 illustrates a reverse side of an electronic device with a touch screen and a touch pad, and it depicts a user interaction with the touch pad.
Figure 7:
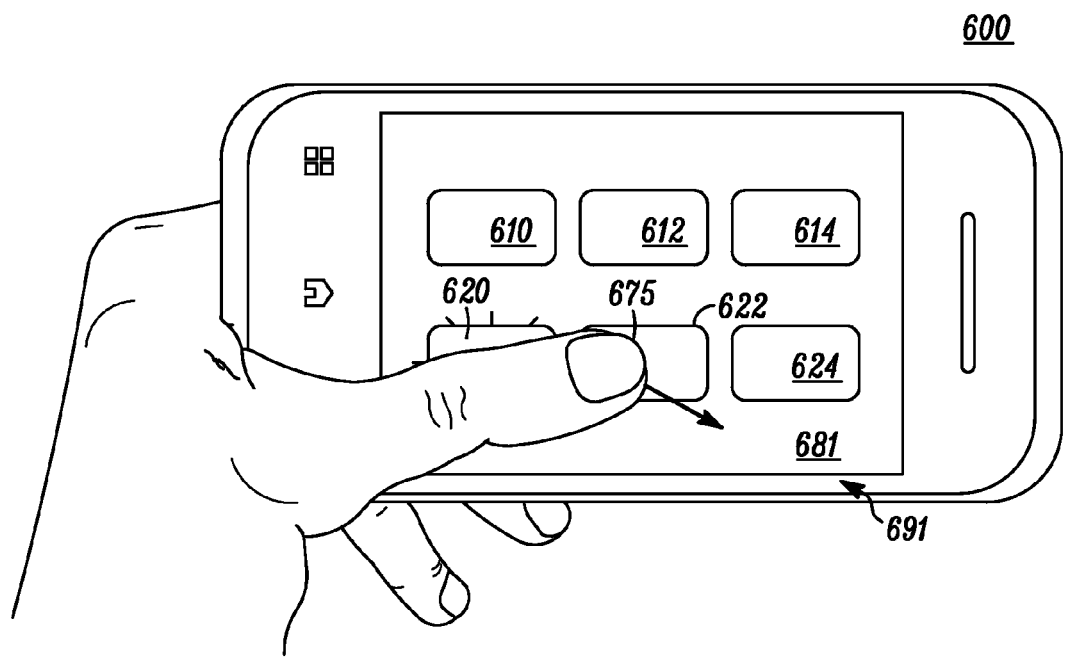
FIG. 7 illustrates an obverse side of the electronic device of FIG. 6, and it depicts a user interaction with the touch screen.
Figure 8:
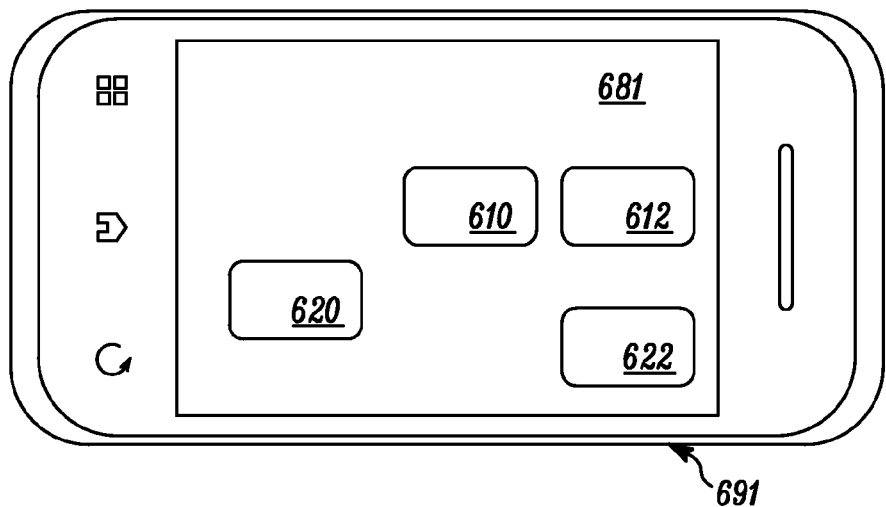
FIG. 8 illustrates an obverse side of the electronic device of FIG. 6 after completion of the user interaction with the touch screen.

Although the touch and the slide are performed on different touch-sensitive surfaces, the electronic device is agnostic as to whether the touch contact is performed on a touch-sensitive surface on the obverse side or the reverse side. FIGS. 6-8 show the same user interaction with the six elements shown in FIGS. 1-3 but starting with a touch on the reverse-side touch-sensitive surface.

FIGS. 6-8 illustrate an obverse side 691 and a reverse side 695 of an electronic device 600 with a touch screen 681 and a touch pad 685. On the obverse side 691, the touch screen 681 displays six graphical user interface elements 610, 612, 614, 620, 622, 624. Instead of touching the touch screen 681 to select a first element, a user touches the touch pad 685 to select the first element. FIG. 6 depicts a touch user interaction 671 with the touch pad 685 to select the first element 620. FIG. 7 illustrates the obverse side 691 of the electronic device 600 with selected element 620 highlighted to provide visual indication of the touch selection from the reverse side 685. Note that the user interaction 671 on the reverse side 695 results in a mirror image selection (i.e., element 620 is selected and not element 624). FIG. 7 also depicts a slide user interaction 675 with the touch screen 681. The user interaction 675 is generally a mirror image of the user interaction 175 shown in FIG. 2, because the slide is performed on the obverse side 691 touch screen 681 instead of the reverse side 695 touch pad 685. The non-selected elements 610, 612, 614, 622, 624 are dragged consistent with the slide user interaction 675, and the graphical user interface at the completion of the slide is the same as shown in FIG. 3. FIG. 8 illustrates the obverse side 691 of the electronic device 600 after completion of the user interaction 675 with the touch screen 681. Note that, in FIG. 8, the touch interaction 671 has ceased and thus there is no selected element at this time.

The dragging manipulation of non-selected elements relative to a stationary selected element allows a user to move one or more elements within the plane of the display screen. A different mode can allow a push manipulation to move non-selected elements virtually in front or behind a selected element in the plane of the display screen.

Figure 9:
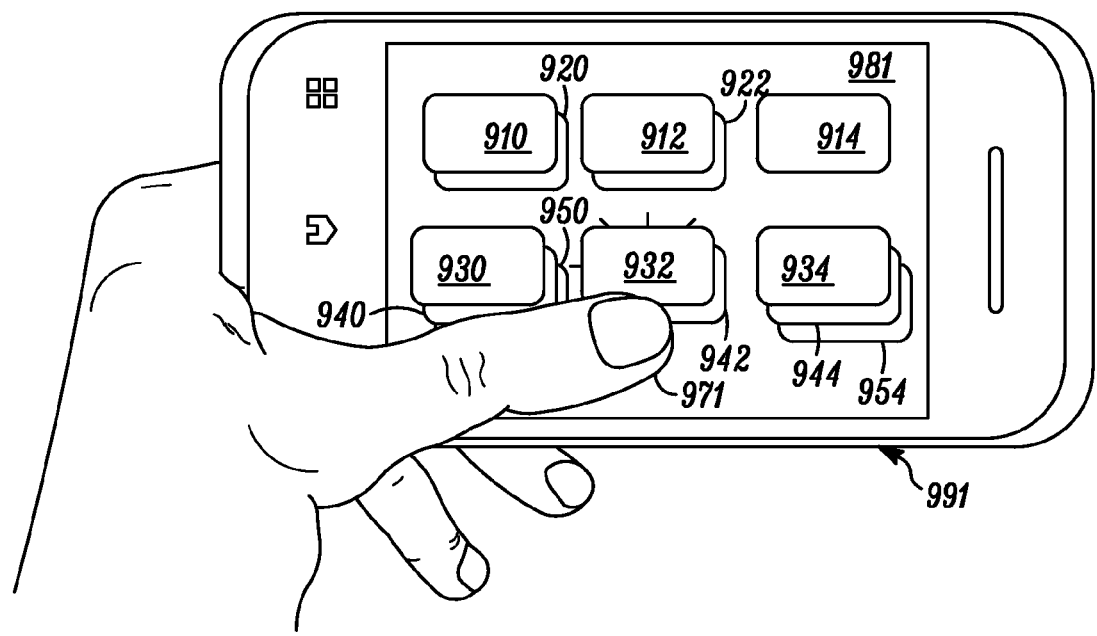
FIG. 9 illustrates an obverse side of an electronic device with a touch screen and a touch pad, and it depicts a user interaction with the touch screen.
Figure 10:
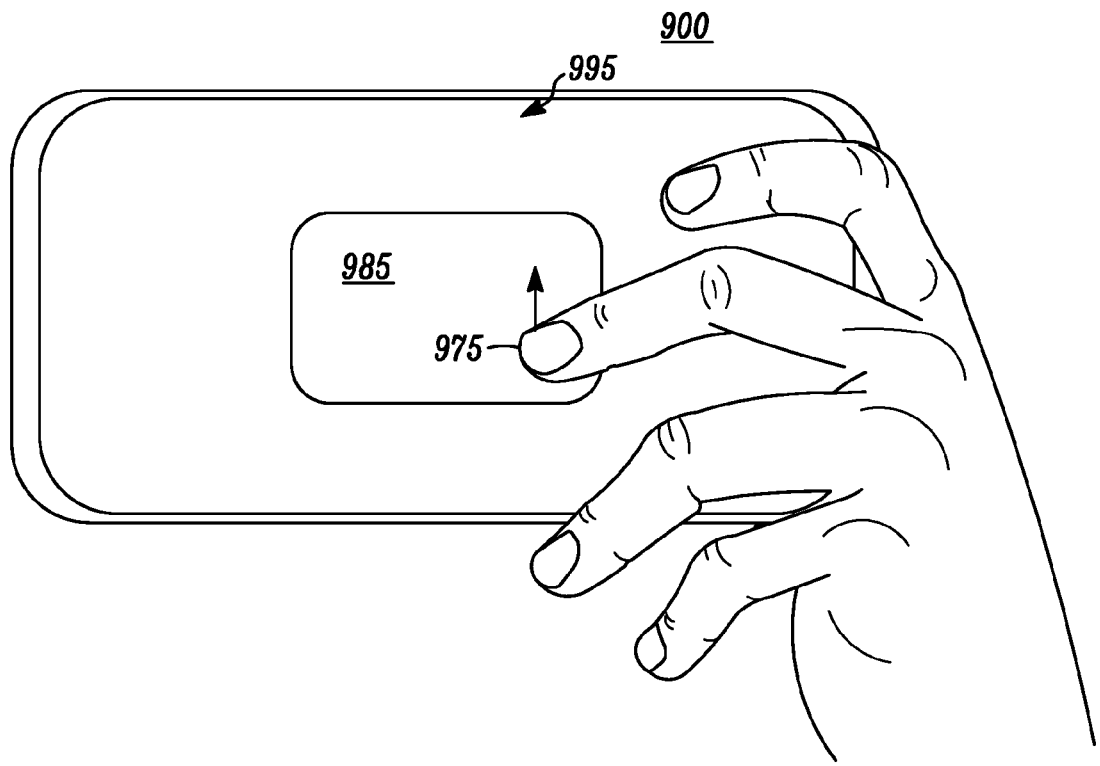
FIG. 10 illustrates a reverse side of the electronic device of FIG. 9, and it depicts a user interaction with the touch pad.
Figure 11:
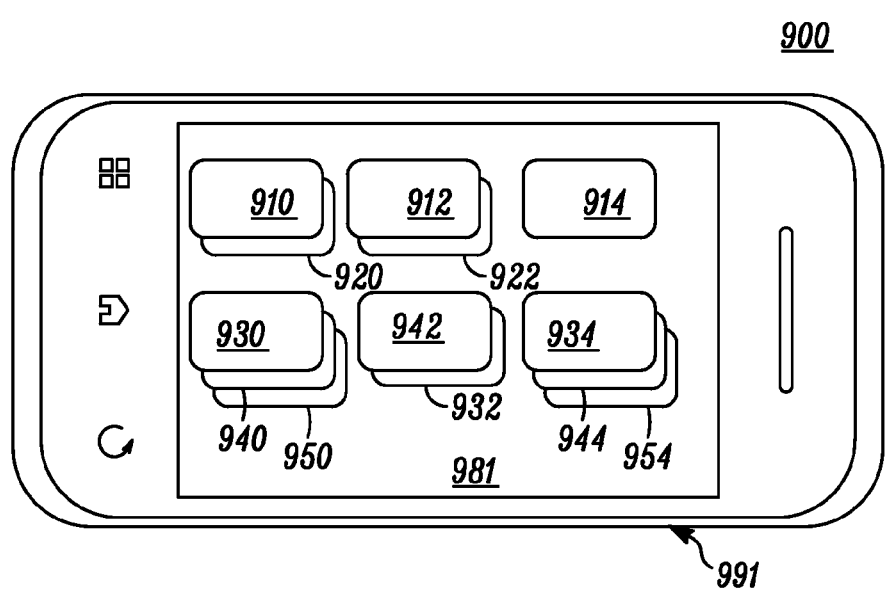
FIG. 11 illustrates an obverse side of the electronic device of FIG. 9 after completion of the user interaction with the touch pad.

FIGS. 9-11 illustrate an obverse side 991 and a reverse side 995 of an electronic device 900 with a touch screen 981 and a touch pad 985. On the obverse side 991, the touch screen 981 displays thirteen graphical user interface elements 910, 912, 914, 920, 922, 9030, 932, 934, 940, 942, 944, 950, 954. These elements are depicted in a virtual three-dimensional matrix. Thus, some elements seem to be "above" or "below" other elements. In order to select an element that is "on top of" another element, the touch screen 981 on the obverse side 991 may be used for selection. In order to select an element that is "underneath" another element, the touch pad 985 on the reverse side 995 may be used for selection.

FIG. 9 depicts a user interaction 971 with the touch screen 981 to select a first element 932. Feedback for the selection is depicted by highlighting the first element 932. Note that the touch location of user interaction 971 is ambiguous and the electronic device 900 defaults to the element 932 that is virtually closer to the touched side (the obverse side, in this example). If an ambiguous touch occurred (i.e., in the same location) on the reverse side, the lower element 942 would have initially been selected. By making slight finger movements, however, the selection may switch to nearby elements as is known in the art.

FIG. 10 depicts a user interaction 975 with the touch pad 985 on the reverse side 995 of the electronic device 900. The slide user interaction directs the electronic device 900 to virtually push the non-selected elements 910, 912, 914, 920, 922, 930, 934, 940, 942, 944, 950, 954 "above" the first element 932. FIG. 11 illustrates the obverse side 991 after completion of the user interaction 975 with the touch pad 985. Note that the first element 932 is now located "below" the other element 942 because all the non-selected elements 910, 912, 914, 920, 922, 930, 934, 940, 942, 944, 950, 954 have been moved "up" relative to the selected element 932. Note also that the touch user interaction 971 was released prior to the completion of the push user interaction 975, so no element is highlighted in FIG. 11.

As alluded to previously, using a touch pad on a reverse side of an electronic device to select an element from the "bottom" of a virtual stack of user interface elements may be easier for a user than trying to select that same element using a touch screen.

Figure 12:
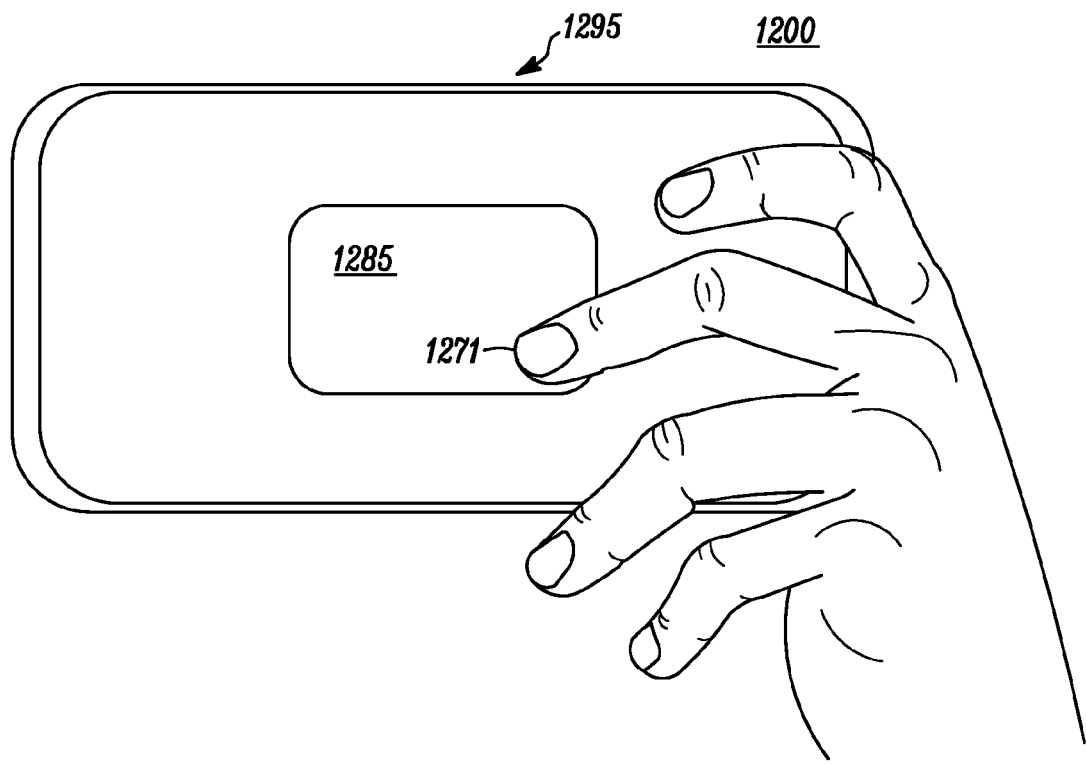
FIG. 12 illustrates a reverse side of an electronic device with a touch screen and a touch pad, and it depicts a user interaction with the touch pad.
Figure 13:
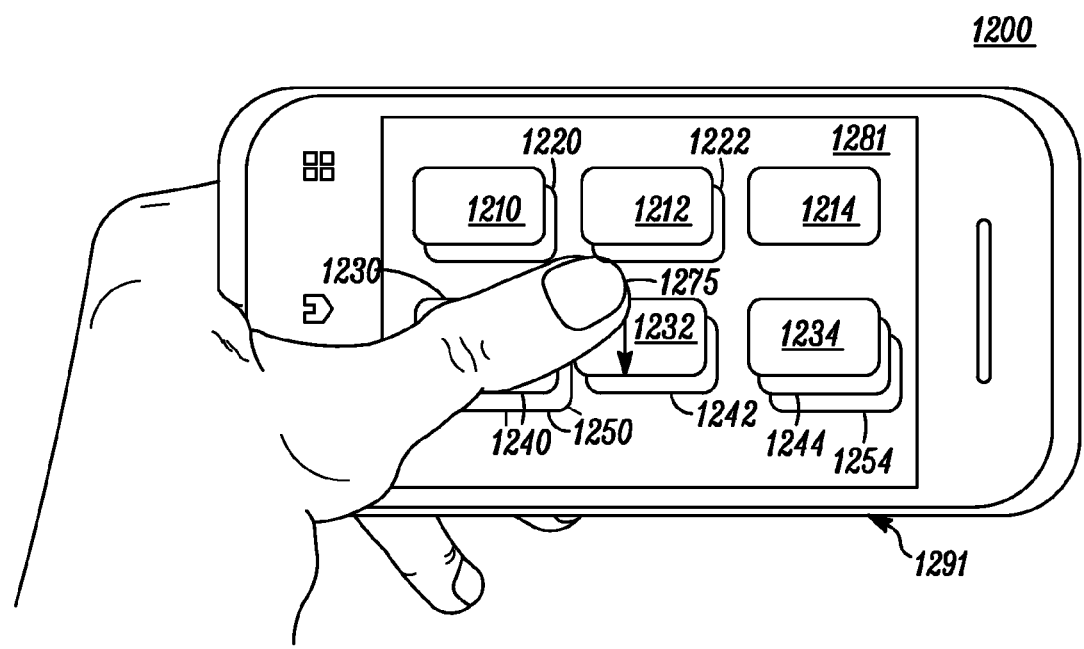
FIG. 13 illustrates an obverse side of the electronic device of FIG. 12, and it depicts a user interaction with the touch screen.
Figure 14:
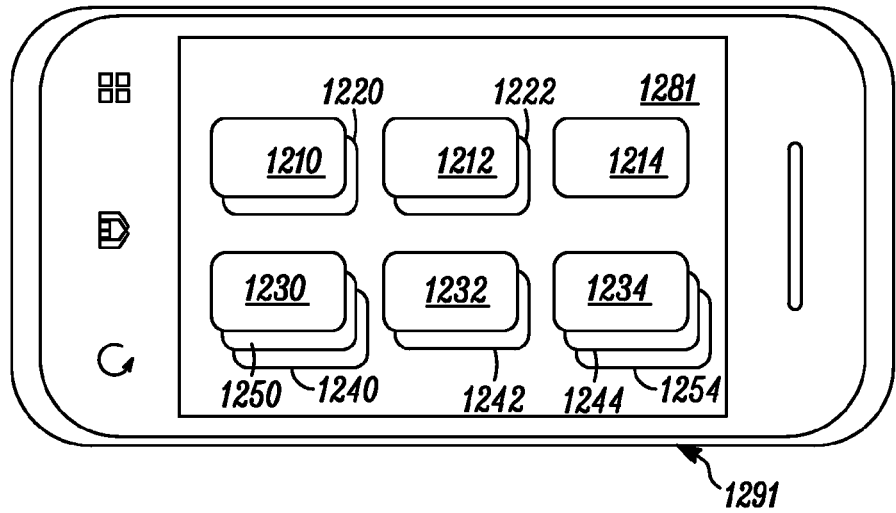
FIG. 14 illustrates an obverse side of the electronic device of FIG. 12 after completion of the user interaction with the touch screen.

FIGS. 12-16 illustrate an obverse side 1291 and a reverse side 1295 of an electronic device 1200 with a touch screen 1281 and a touch pad 1285. On the obverse side 1291, the touch screen 1281 displays thirteen graphical user interface elements 1210, 1212, 1214, 1220, 1222, 1230, 1232, 1234, 1240, 1242, 1244, 1250, 1254 in a virtual three-dimensional matrix similar to FIG. 9. FIG. 12 depicts a user interaction 1271 with the touch pad 1285. The user touches the touch pad 1285 in a location that could be interpreted as a selection of any one of elements 1230, 1240, or 1250. Because the touch user interaction 1271 is from the reverse side 1295, however, the electronic device 1200 selects the "lowest" element 1250 of the stack by default. In this example, the electronic device 1200 provides user feedback regarding the selection by highlighting the element 1250. Slight finger movement will adjust the default selection as desired by the user and should be reflected back to the user via visual or audible feedback. After the first element 1250 is properly selected, the user performs a slide user interaction 1275 on the other touch-sensitive surface. FIG. 13 depicts a slide user interaction 1275 with the touch screen 1281. This slide user interaction 1275 is slight and thus moves the non-selected user elements 1210, 1212, 1214, 1220, 1222, 1230, 1232, 1234, 1240, 1242, 1244, 1254 only by one level in the virtual three-dimensional matrix. Thus, the first element 1250 has moved from "below" the other elements 1230, 1240 in its stack to "between" the other elements 1230, 1240 as shown in FIG. 14.

Figure 15:
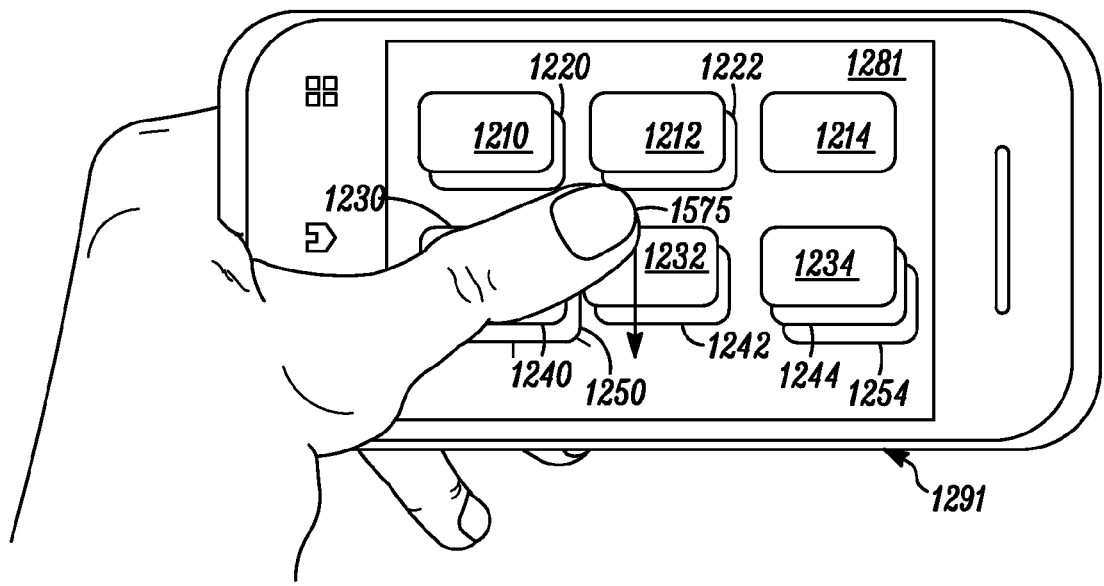
FIG. 15 illustrates an obverse side of the electronic device of FIG. 12, and it depicts an alternate user interaction with the touch screen.

FIG. 15 depicts an alternate user interaction 1575 with the touch screen 1281. In this situation, the same first element 1250 is selected, but the slide user interaction 1575 is more prominent and thus moves the non-selected user elements 1210, 1212, 1214, 1220, 1222, 1230, 1232, 1234, 1240, 1242, 1244, 1254 two levels down in the virtual three-dimensional matrix. In this example, the first element 1250 has moved from "below" the other elements 1230, 1240 in its stack to "above" the other elements 1230, 1240 as shown in FIG. 16. Although some of the non-selected elements 1240, 1254 have moved off the bottom edge of the touch screen 1281 due to the limited size of the touch screen, a scrolling function (not shown) may be implemented to move those elements 1240, 1254 back onto the touch screen 1281.

In addition to linear slide movements directing drag and push interactions with graphical user interface elements, a circular slide movement may direct rotate interactions with graphical user interface elements. FIGS. 17-19 illustrate an obverse side 1791 and a reverse side 1795 of an electronic device 1700 with a touch screen 1781 and a touch pad 1785. FIG. 17 depicts a touch user interaction 1771 with the touch screen 1781 to select one thumbnail photograph graphical user interface element 1710 out of the two photograph graphical user interface elements 1710, 1720 displayed on the touch screen 1781. FIG. 18 depicts a slide user interaction 1775 with the touch pad 1785 on the reverse side 1795 of the electronic device 1700. This clockwise circular slide user interaction 1775 directs the electronic device 1700 to rotate the non-selected graphical user interface element 1720 counterclockwise (due to the mirror image effect of slide user interactions on the reverse side 1795).

FIG. 19 illustrates an obverse side 1791 of the electronic device 1700 after completion of the slide user interaction 1775 with the touch pad 1785. More degrees in a circular slide user interaction can increase the rotation of the non-selected graphical user interface element. For example, the 180 degrees of circular slide interaction 1775 shown translates to 90 degrees of rotation of the non-selected graphical user interface element 1720. Extrapolating this mapping, 360 degrees of circular slide interaction would translate to 180 degrees of rotation of the non-selected graphical user interface element, and 540 degrees of circular slide interaction would translate to 270 degrees of rotation of the non-selected graphical user interface element. Alternately, the mapping of the circular slide interaction to rotation of the non-selected graphical user interface element could be more direct, such as 180 degrees of circular slide interaction translating to 180 degrees of rotation of the non-selected graphical user interface element.

A slide user interaction on a second touch-sensitive surface can also direct a pixel-based move relative to a first element selected using a touch user interaction on a first touch-sensitive surface. This variant mode uses a touch user interaction to select a pixel to "anchor" instead of a graphical user interface element in its entirety. Pixel-based moves allow a user to direct zoom in/out interactions and enlarge/reduce interactions.

Figure 20:
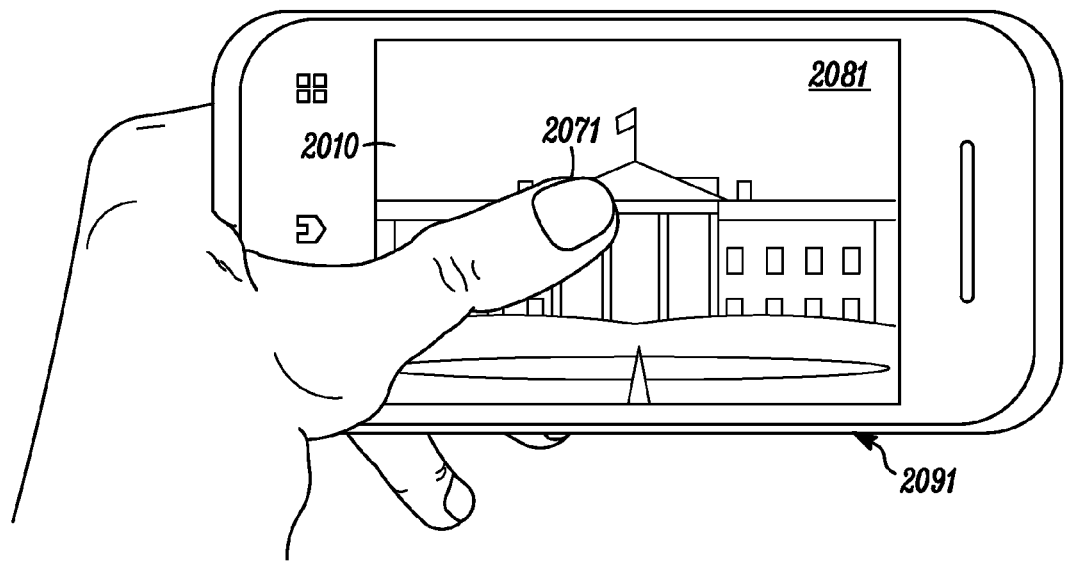
FIG. 20 illustrates an obverse side of an electronic device with a touch screen and a touch pad, and it depicts a user interaction with the touch screen.

FIGS. 20-24 illustrate an obverse side 2091 and a reverse side 2095 of an electronic device 2000 with a touch screen 2081 and a touch pad 2085. On the obverse side 2091, the touch screen 2081 displays a digital photograph 2010. FIG. 20 depicts a touch user interaction 2071 with the touch screen. This touch user interaction 2071 selects a pixel that will be the central pixel of a zoom in/out function that will be directed by a slide user interaction 2075, 2375 on a touch pad 2085 on the reverse side 2095 of the electronic device 2000.

Figure 21:
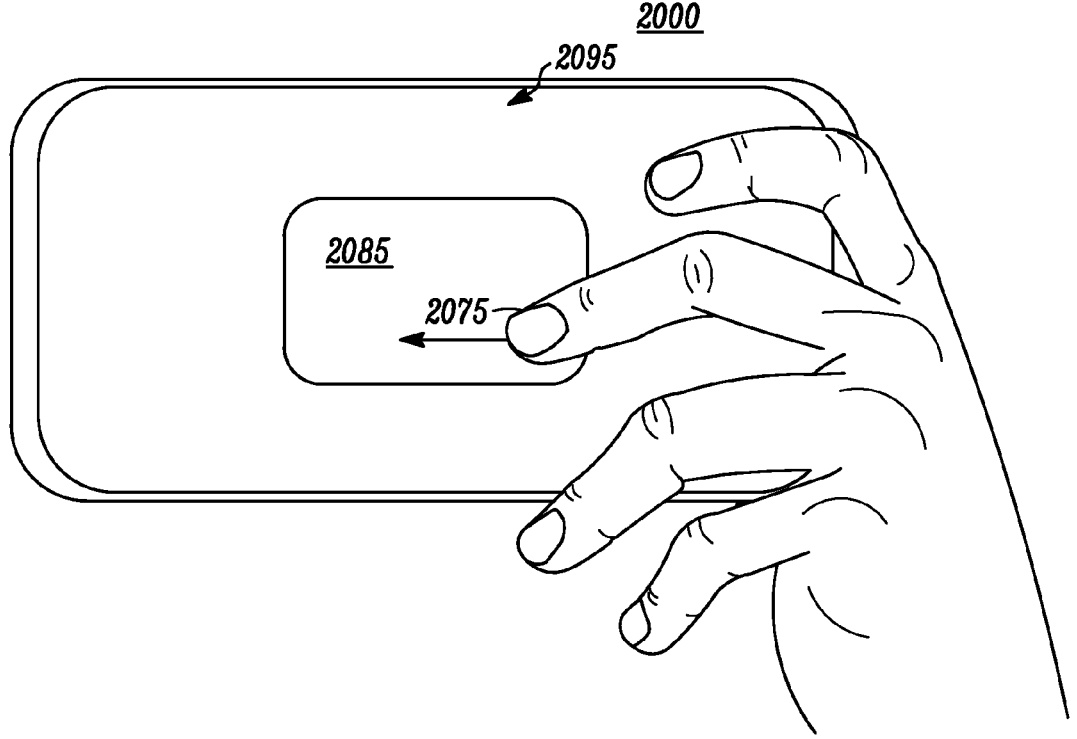
FIG. 21 illustrates a reverse side of the electronic device of FIG. 20, and it depicts a user interaction with the touch pad.
Figure 22:
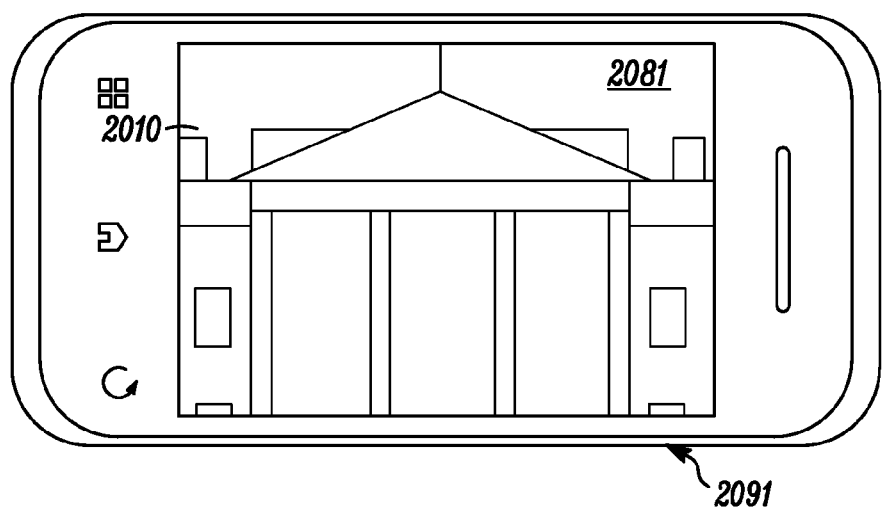
FIG. 22 illustrates an obverse side of the electronic device of FIG. 20 after completion of the user interaction with the touch pad.
Figure 23:
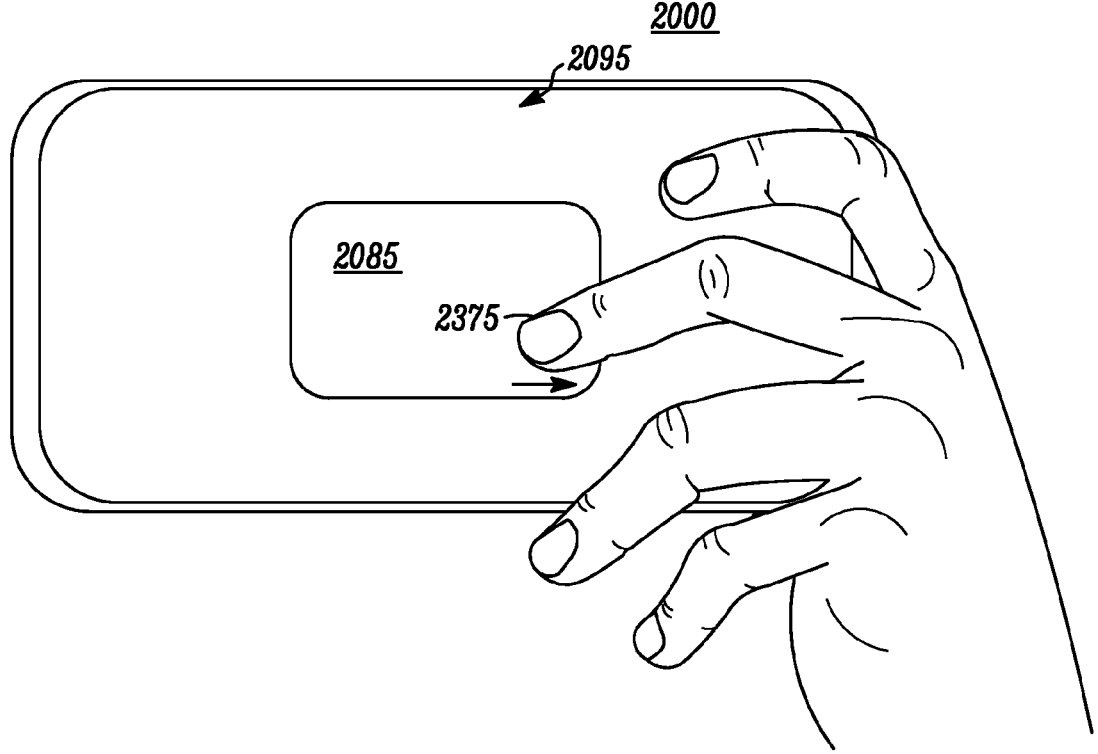
FIG. 23 illustrates a reverse side of the electronic device of FIG. 20, and it depicts an alternate user interaction with the touch pad.
Figure 24:
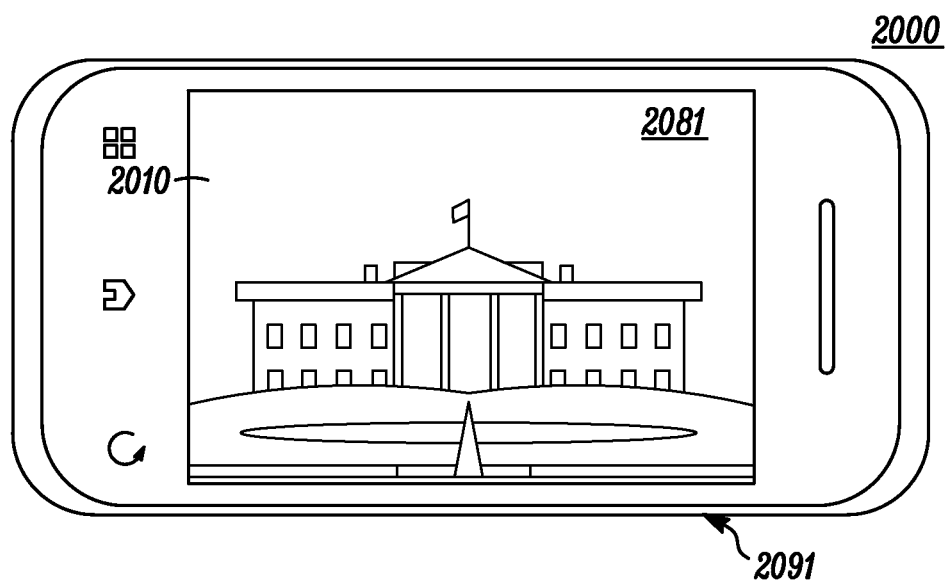
FIG. 24 illustrates an obverse side of the electronic device of FIG. 20 after completion of the alternate user interaction with the touch pad.

FIG. 21 depicts a slide user interaction 2075 with the touch pad 2085. This slide interaction 2075 directs the processor of the electronic device 2000 to zoom in the digital photograph 2010. The direction, speed, pressure, and/or length of the slide may direct the enlargement value of the zoom function. In this example, sliding to the left (as shown in FIG. 21) directs a zoom in as shown in FIG. 22. Meanwhile, sliding to the right (as shown in FIG. 23) directs a zoom out as shown in FIG. 24.

Figure 25:
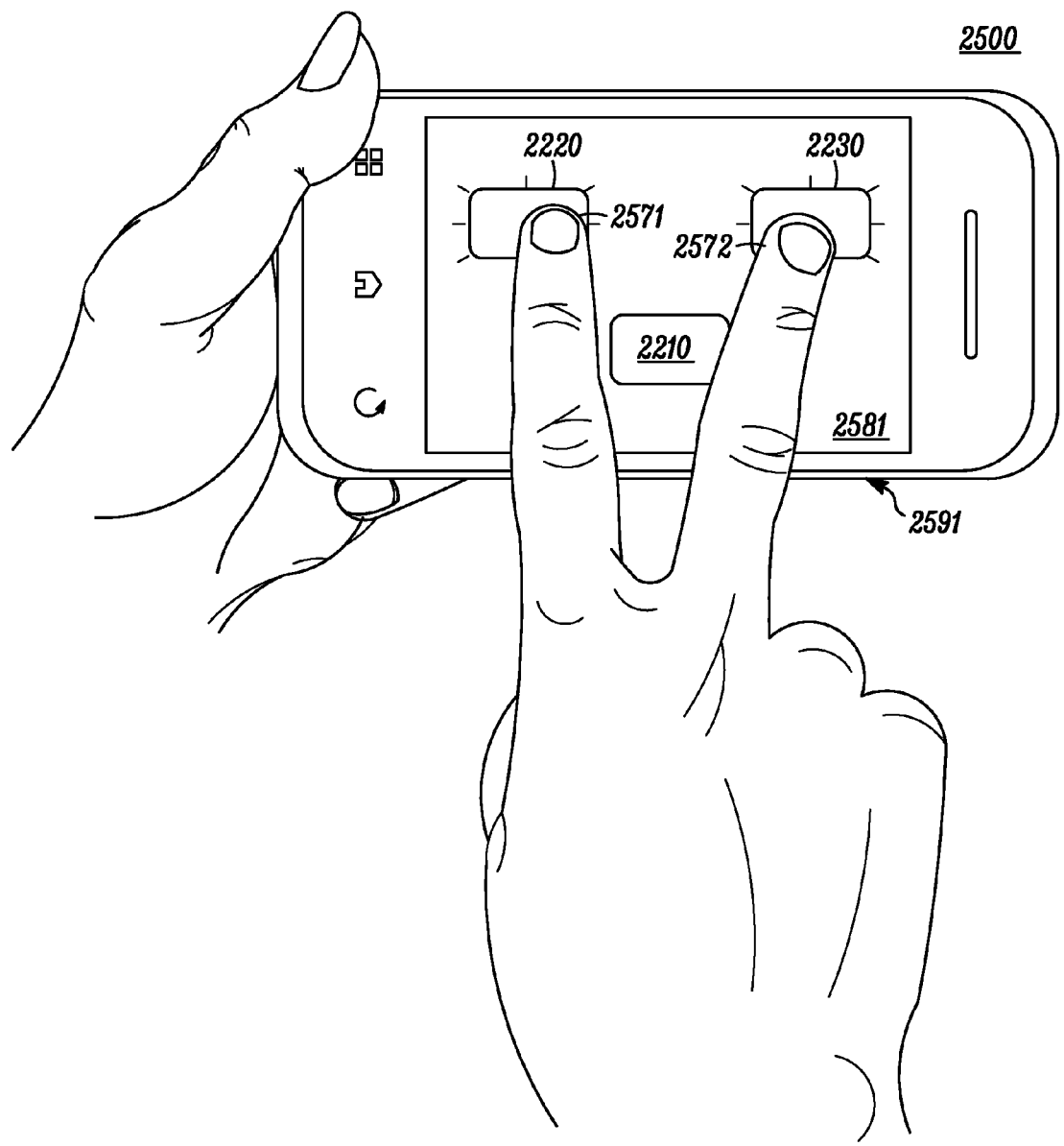
FIG. 25 illustrates an obverse side of an electronic device with a touch screen and a touch pad, and it depicts a user interaction with the touch screen.

FIGS. 25-29 illustrate an obverse side 2591 and a reverse side 2595 of an electronic device 2500 with a touch screen 2581 and a touch pad 2585. In this example, a slide user interaction 2575, 2875 directs an enlargement or a reduction of a non-selected icon 2210. FIG. 25 depicts a user interaction 2571, 2572 with the touch screen 2581 that selects two interactive user elements 2220, 2230 from the three interactive user elements 2210, 2220, 2230 displayed. Note that in this case, the touch user interaction 2571, 2572 is a dual-touch user interaction and the two user elements could also be considered a two-part selected first element.

Figure 26:
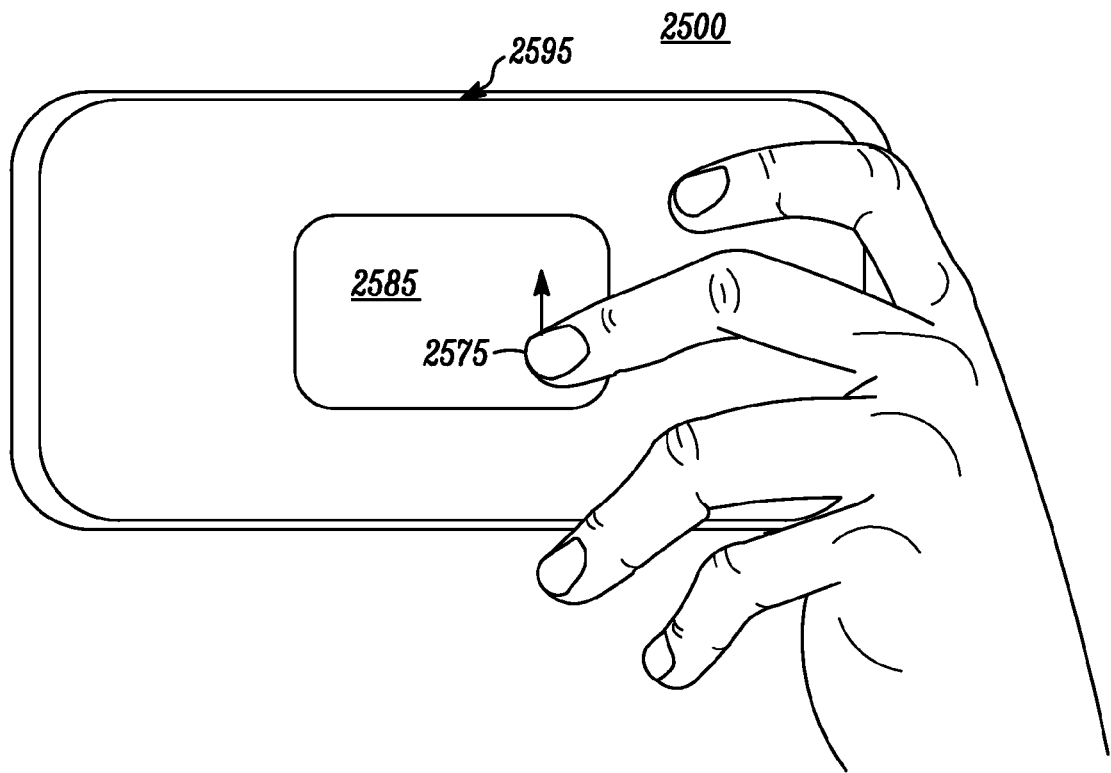
FIG. 26 illustrates a reverse side of the electronic device of FIG. 25, and it depicts a user interaction with the touch pad.
Figure 27:
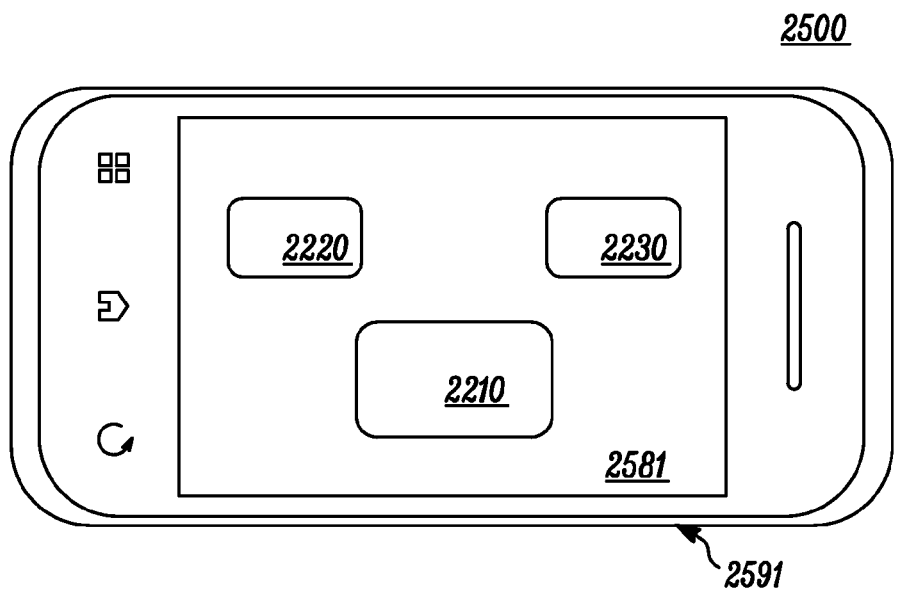
FIG. 27 illustrates an obverse side of the electronic device of FIG. 25 after completion of the user interaction with the touch pad.

FIG. 26 depicts a slide user interaction 2575 with the touch pad 2585 on the reverse side 2595 of the electronic device 2500. In this mode, the slide user interaction 2575 enlarges the non-selected interactive user element 2210 as shown. The slide speed, direction, pressure, and/or length may determine the degree of enlargement implemented by the processor of the electronic device 2500 as shown in FIG. 27.

Figure 28:
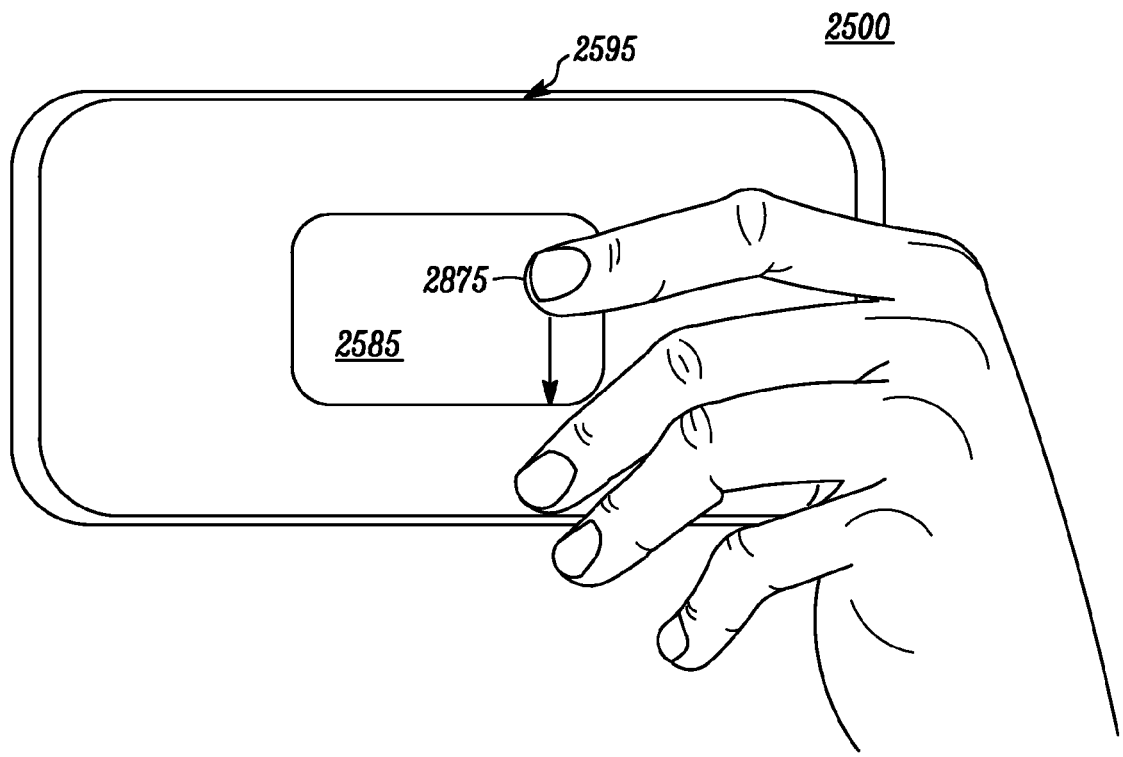
FIG. 28 illustrates a reverse side of the electronic device of FIG. 25, and it depicts an alternate user interaction with the touch pad.
Figure 29:
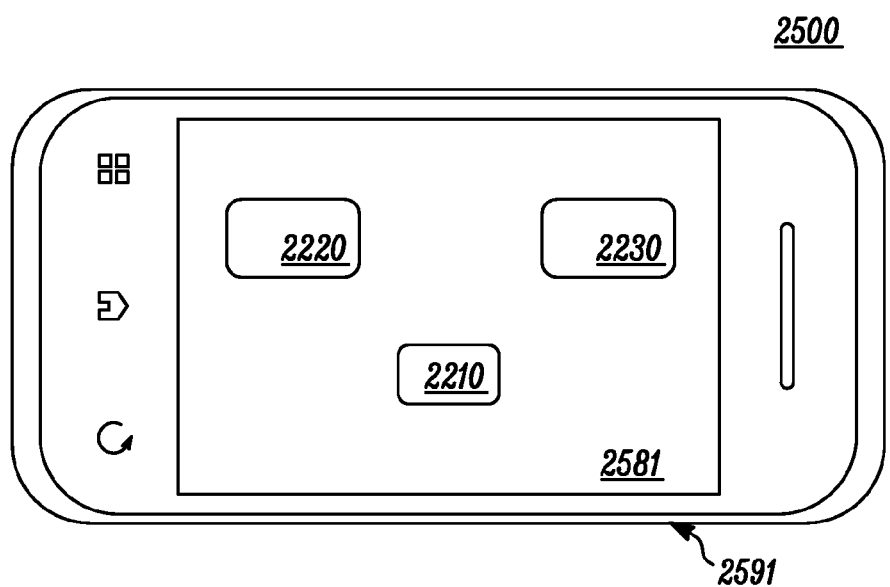
FIG. 29 illustrates an obverse side of the electronic device of FIG. 25 after completion of the alternate user interaction with the touch pad.

FIG. 28 depicts an alternate user interaction 2875 with the touch pad 2585. In this example, a slide in the "up" direction directs an enlargement and a slide in the "down" direction" directs a reduction. FIG. 29 illustrates an obverse side 2591 of the electronic device 2500 after completion of the alternate user interaction 2875 with the touch pad 2585.

Figure 30:
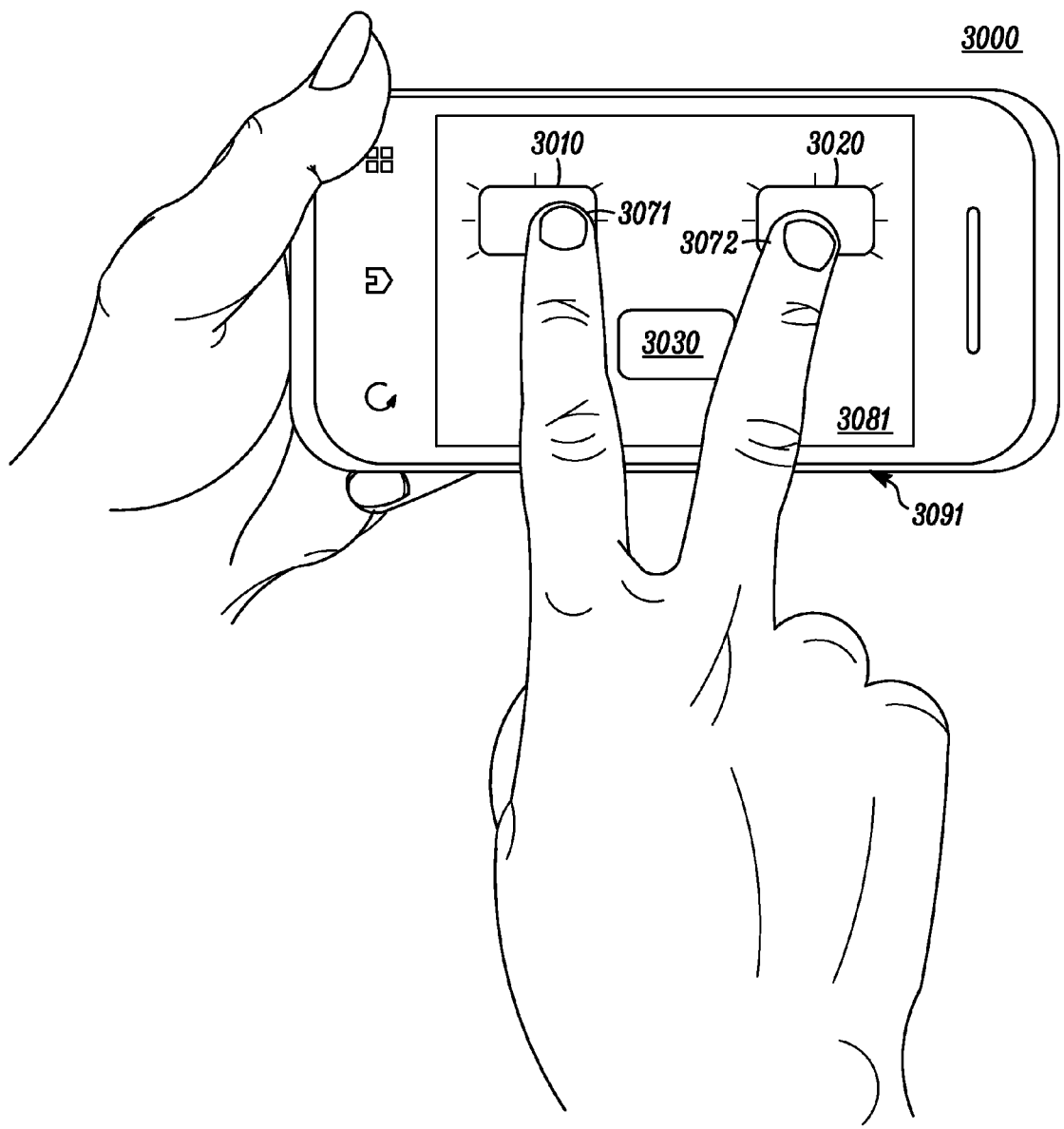
FIG. 30 illustrates an obverse side of an electronic device with a touch screen and a touch pad, and it depicts a user interaction with the touch screen.
Figure 31:
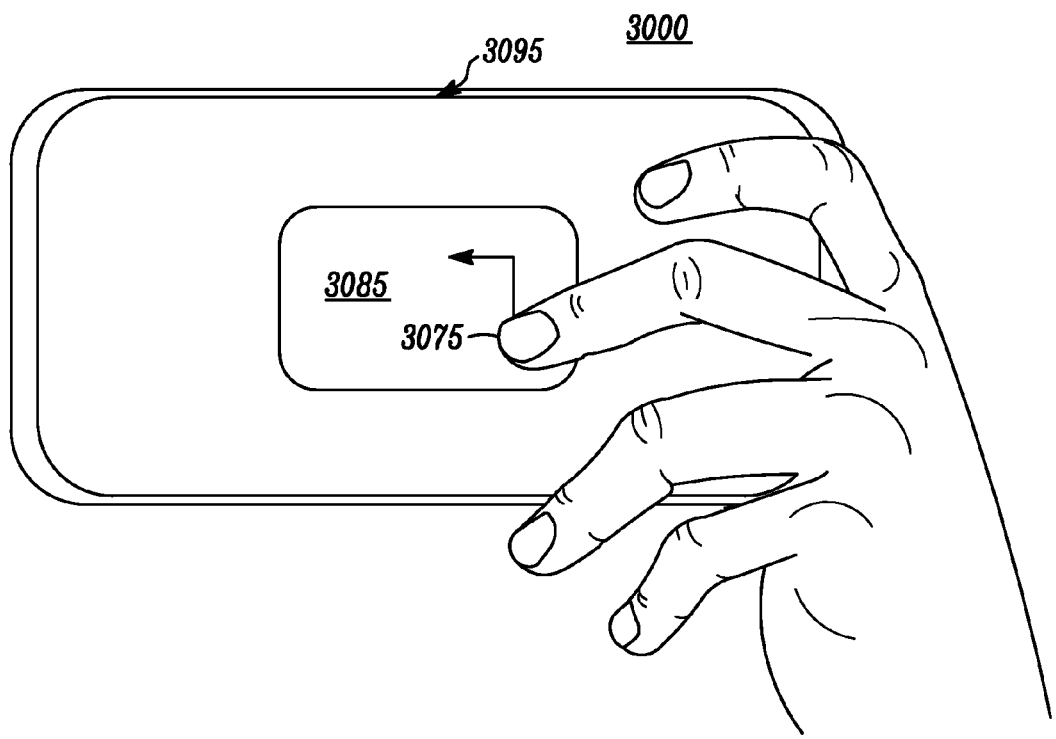
FIG. 31 illustrates a reverse side of the electronic device of FIG. 30, and it depicts a user interaction with the touch pad.
Figure 32:
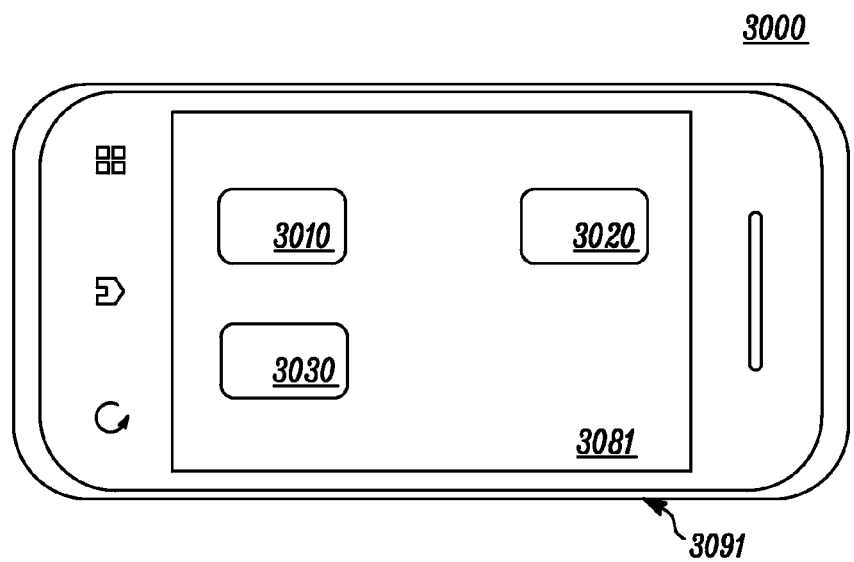
FIG. 32 illustrates an obverse side of the electronic device of FIG. 30 after completion of the user interaction with the touch pad.

More complicated slide user interactions may be implemented on an electronic device. FIGS. 30-32 illustrate an obverse side 3091 and a reverse side 3095 of an electronic device 3000 with a touch screen 3081 and a touch pad 3085. In this example, instead of a linear slide gesture directing movement of non-selected elements as shown in FIGS. 1-3, 6-16, and 20-29 or a circular slide gesture as shown in FIGS. 17-19, FIG. 31 depicts an angled slide user interaction 3075. FIG. 30 depicts a user interaction 3071, 3072 with two interactive user elements 3010, 3020 displayed on the touch screen 3081. This dual-touch user interaction 3071, 3072 anchors both elements 3010, 3020 (i.e., a dual-part selected element) such that a subsequent slide interaction does not move the anchored elements 3010, 3020.

FIG. 31 depicts a slide user interaction 3075 with the touch pad 3085 on the reverse side 3095 of the electronic device 3000. This slide interaction 3075 is angled with an "up" portion followed by a "right" portion. Such a dual-slide user interaction may be helpful to prevent unintended adjustment of interactive user interface elements due to inadvertent contact with the electronic device's touch-sensitive surfaces. As shown in FIG. 32, the dual-slide user interaction 3075 directs the non-selected element 3030 to move left (due to the mirror effect of the slide on the reverse side 3095). The "up" portion of the slide interaction 3075 does not direct a drag of the non-selected element 3030 but rather complicates the slide user interaction such that inadvertent drags are less likely to occur.

Figure 33:
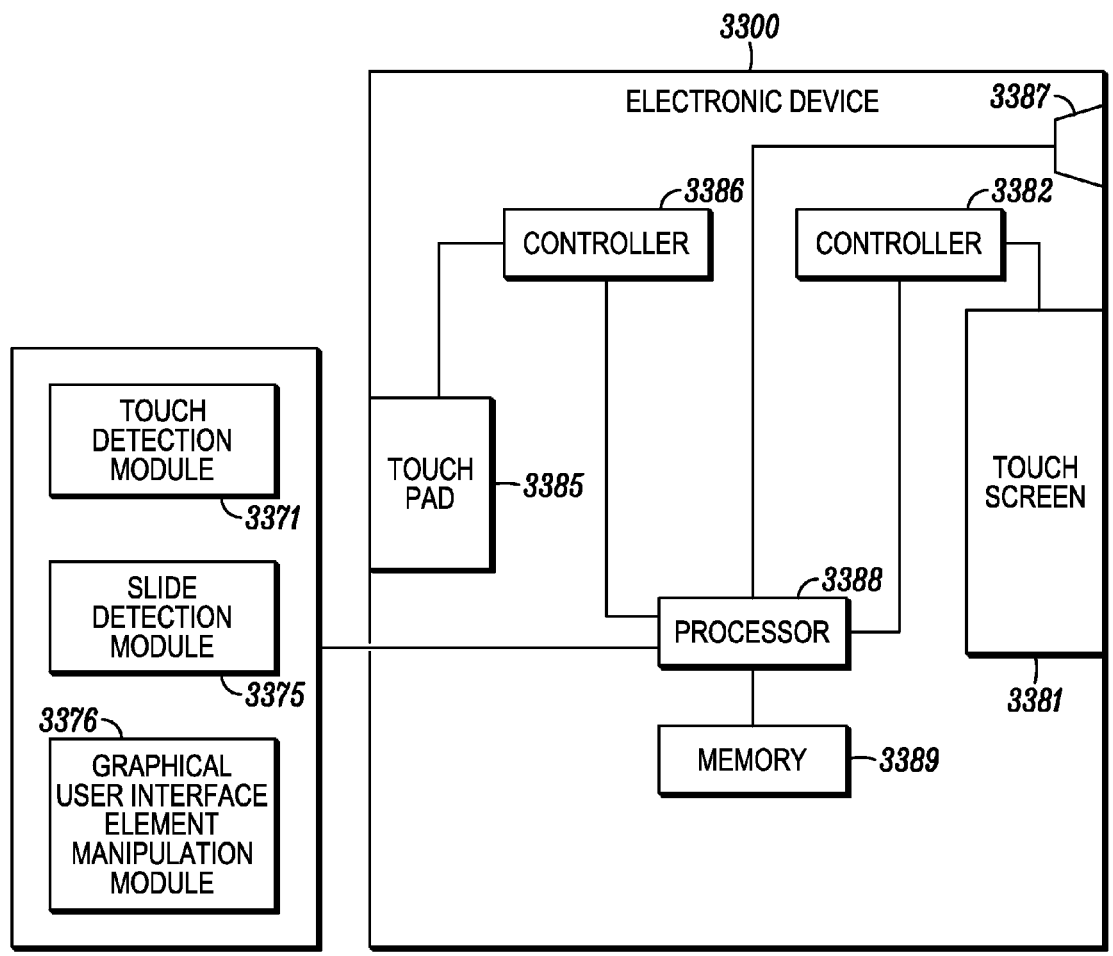
FIG. 33 illustrates a simplified block diagram of an electronic device with a touch screen and a touch pad.

FIG. 33 illustrates a simplified block diagram of an electronic device 3300 with a touch screen 3381 and a touch pad 3385. As shown, the touch screen 3381 is on an obverse side of the electronic device 3300 and the touch pad 3385 is on a reverse side of the electronic device 3300. In other embodiments, however, the touch pad could be on the top of the electronic device, the bottom of the electronic device, or even on the obverse side of the electronic device along with the touch screen 3381. As noted previously, the touch screen 3381 and touch pad 3385 are examples of touch-sensitive surfaces, and the touch pad 3385 can be replaced with a second touch screen in an alternate embodiment. The electronic device 3300 also has a touch screen controller 3382 coupled to the touch screen 3381 and a touch pad controller 3386 coupled to the touch pad 3385. Both controllers 3382, 3386 are coupled to a processor 3388. In other embodiments, the controllers may be integrated into a single controller or into the processor 3388. The processor 3388 receives signals from the touch screen 3381 and touch pad 3385 via their respective controllers 3382, 3386 and directs signals to the touch screen 3381 display (via its controller 3382) and/or audio speaker 3387.

A memory 3389, coupled to the processor 3388, stores software programs for manipulating graphical user interface elements in accordance with the flow diagram of FIG. 5, an operating system, various application programs, and data files. The memory 3389 can include one or more forms of volatile and/or non-volatile, fixed and/or removable memory, such as read-only memory (ROM), electronic programmable read-only memory (EPROM), random access memory (RAM), and erasable electronic programmable read-only memory (EEPROM).

When executing various software programs, the processor 3388 has a touch detection module 3371 for detecting a touch user interaction on a first touch-sensitive surface of an electronic device 3300. The detection module determines which graphical user interface element has been selected via the detected touch. A slide detection module 3375 detects a slide user interaction on a second touch-sensitive surface of the electronic device 3300. Based on the detected slide motion (possibly including pressure, velocity, direction, and pattern of the slide motion), a graphical user interface element manipulation module 3376 manipulates non-selected interactive user elements relative to the first interaction user element(s) based on the slide user interaction. As mentioned previously, the manipulation may be classified as drag, push, rotate, or pixel-based moves based on the slide user interaction. Signals from the manipulation module are coupled to the display screen controller 3382 to cause the graphical user interface elements to change as directed by the processor 3388.

The electronic device 3300 can also include a variety of other components (not shown) based on the particular implementation. For example, if the electronic device 3300 was implemented as a mobile phone, it would also include a microphone and a wireless transceiver and possibly additional input components such as a keypad, accelerometer, and vibration alert. If the electronic device 3300 was implemented as a remote controller, an infrared transmitter could also be included.

Figure 34:
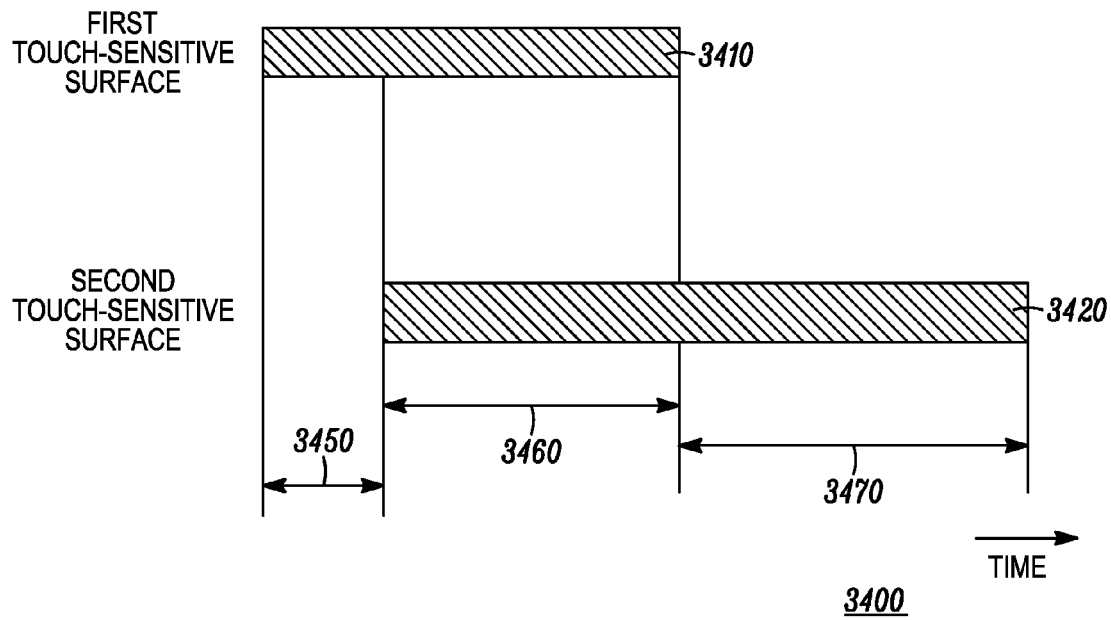
FIGS. 34-35 illustrate various timing options available for user interaction with the touch screen and the touch pad.
Figure 35:
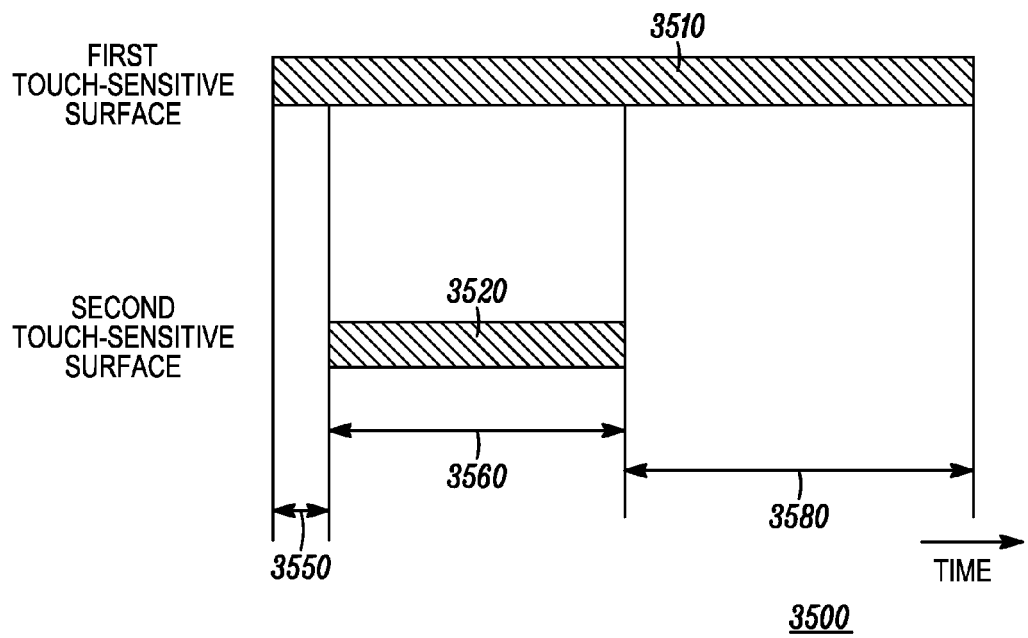

FIGS. 34-35 illustrate various timing options available for user interaction with the touch screen and the touch pad. In FIG. 34, a touch user interaction 3410 occurs on a first touch-sensitive surface of an electronic device. This touch user interaction 3410 has a positive time duration as shown. After starting the touch user interaction 3410 and before ending the touch user interaction 3410, a slide user interaction 3420 occurs on a second touch-sensitive surface of the electronic device. The time elapsed 3450 between the commencement of the touch user interaction 3410 and the commencement of the slide user interaction 3420 may be any positive value time period, including a zero time elapsed—which means that the touch interaction 3410 and the slide interaction 3420 commenced at almost the same time. (The tolerance for a "zero time elapsed" determination may be set by a manufacturer setting, a user-configurable setting, or through a learning process by the electronic device.)

The touch interaction 3410 and the slide interaction 3420 both continue for a period of time 3460, and it is generally expected that a user will release the touch interaction 3410 before completing the slide interaction 3420 as shown in FIG. 34, resulting in a time period 3470 where the electronic device only detects the slide interaction 3420. FIGS. 6-32 all presume the kind of timing depicted in FIG. 34. The touch user interaction 3410 on a first touch-sensitive surface selects an interactive user element (or pixel) on a display of the electronic device while the slide user interaction 3420 on a second touch-sensitive surface manipulates other interactive user elements on the display.

FIG. 35 illustrates an alternate timing option where the touch user interaction 3510 starts before and ends after a slide user interaction 3520. This situation occurs in FIGS. 1-4 described earlier. Thus, there is a time period 3550 between starting the touch user interaction 3510 and starting the slide user interaction 3520, a time period 3560 when the electronic device detects both the touch user interaction 3510 and the slide user interaction 3520, followed by a time period 3580 after the slide interaction 3520 completes where the touch interaction 3510 remains. In this time period 3580, the touch user interaction 3510 could change to become a drag user interaction (or other type of touch-based user interaction) as shown in FIG. 3.

Thus, the electronic device and method for manipulating graphical user interface elements detects a touch user interaction on a first touch-sensitive surface of an electronic device to select a first interactive user element, detects a slide user interaction on a second touch-sensitive surface of the electronic device, and manipulates non-selected interactive user elements relative to the first interaction user elements based on the slide user interaction. This document has disclosed drag, push, rotate, and pixel-based moves based on the slide user interaction.

While the present invention is susceptible of embodiment in various forms, the drawings show and the text describes embodiments with the understanding that the present disclosure is to be considered an exemplification of the invention and is not intended to limit the invention to the specific embodiments illustrated. Furthermore, while the various figures are intended to illustrate the various claimed aspects of the present invention, in doing so, the elements are not necessarily intended to be drawn to scale. In other words, the size, shape, and dimensions of some elements, features, components, and/or regions are for purposes of clarity (or for purposes of better describing or illustrating the concepts intended to be conveyed) and may be exaggerated and/or emphasized relative to other illustrated elements.

While various embodiments of the invention have been illustrated and described, it is to be understood that the invention is not so limited. Numerous modifications, changes, variations, substitutions, and equivalents will occur to those skilled in the art without departing from the spirit and scope of the present invention as defined by the appended claims.

We claim:

1. A method for manipulating graphical user interface elements comprising:
    displaying at least two elements on a touch screen of an electronic device;
    selecting a first element based on a touch contact detected on a first side of the electronic device;
    virtually pushing a second element above or below the first element, outside the virtual plane of the touch screen, based on a slide contact detected on a second side of the electronic device.

2. A method in accordance with claim 1, further comprising:
    ceasing the virtually pushing based on detecting cessation of the slide contact.

3. A method in accordance with claim 2, further comprising:
    virtually pushing the first element based on movement of the touch contact.

4. A method in accordance with claim 1, further comprising:
    detecting a speed of the slide contact; and
    performing the virtually pushing based on the speed.

5. A method in accordance with claim 1, further comprising:
    detecting a length of the slide contact; and
    performing the virtually pushing based on the length.

6. A method in accordance with claim 1, further comprising:
    detecting a pressure of the slide contact; and
    performing the virtually pushing based on the pressure.

7. A method in accordance with claim 1, further comprising:
    detecting a direction of the slide contact; and
    performing the virtually pushing based on the direction.

8. A method in accordance with claim 1, further comprising:
    detecting a pattern of the slide contact; and
    performing the virtually pushing based on the pattern.

9. A method in accordance with claim 1 wherein the touch contact and the slide contact at least partially overlap in time.

10. A method in accordance with claim 9 wherein the touch contact begins prior to the slide contact beginning.

11. A method in accordance with claim 1 wherein the selecting comprises:
    graphically changing properties of the first element.

12. A method in accordance with claim 1 wherein the selecting comprises:
    creating an audible signal.

13. An electronic device comprising:
    a touch-sensitive display for displaying at least two graphical user interface elements;
    a touch-sensitive surface;
    a processor, coupled to the touch-sensitive display and the touch-sensitive surface including:
        a touch detection module for detecting a touch user interaction on the touch-sensitive display or the touch-sensitive surface and for selecting a first graphical user interface element;
        a slide detection module for detecting a slide user interaction on the touch-sensitive display or the touch-sensitive surface; and
        a manipulation module for virtually pushing a second graphical user interface element above or below the first graphical user interface element, outside the virtual plane of the touch screen, based on the slide user interaction.

14. An electronic device in accordance with claim 13, wherein the touch-sensitive display is positioned on an obverse side of the electronic device.

15. An electronic device in accordance with claim 13, wherein the touch-sensitive surface is positioned on a reverse side of the electronic device.

* * * * *